(12) United States Patent
Strothmann et al.

(10) Patent No.: US 8,452,511 B2
(45) Date of Patent: May 28, 2013

(54) MOTORIZED WHEELCHAIR

(71) Applicants: Thomas Strothmann, Bramsche (DE); Joseph B. Richey, Chagrin Falls, OH (US)

(72) Inventors: Thomas Strothmann, Bramsche (DE); Joseph B. Richey, Chagrin Falls, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 13/680,580

(22) Filed: Nov. 19, 2012

(65) Prior Publication Data

US 2013/0080015 A1   Mar. 28, 2013

Related U.S. Application Data

(63) Continuation of application No. 12/531,921, filed as application No. PCT/US2008/052579 on Jan. 31, 2008, now Pat. No. 8,315,770.

(60) Provisional application No. 60/988,918, filed on Nov. 19, 2007.

(30) Foreign Application Priority Data

Mar. 19, 2007   (EP) ..................... 07104438

(51) Int. Cl.
  *B60L 15/20* (2006.01)
  *G06F 17/00* (2006.01)
(52) U.S. Cl.
  USPC .................. 701/72; 701/42; 180/6.5
(58) Field of Classification Search
  USPC .............. 701/72, 42, 69; 180/6.5, 907
  See application file for complete search history.

(56) References Cited

U.S. PATENT DOCUMENTS

| 4,415,049 A | 11/1983 | Wereb |
| 4,471,273 A | 9/1984 | Melocik et al. |
| 4,511,825 A | 4/1985 | Klimo |

(Continued)

FOREIGN PATENT DOCUMENTS

| DE | 3304708 | 8/1984 |
| DE | 3832125 | 7/1989 |

(Continued)

OTHER PUBLICATIONS

Office action from U.S. Appl. No. 09/932,182 dated Jan. 2, 2003.

(Continued)

*Primary Examiner* — Tan Q Nguyen
(74) *Attorney, Agent, or Firm* — Calfee, Halter & Griswold LLP

(57) ABSTRACT

A motorized wheelchair includes left and right drive wheels, left and right motors, rate-of-turn sensor, first and second speed sensors, and controller arranged to combine signals from the sensors in a manner that detects drift. Alternatively, the motorized wheelchair includes left and right drive wheels, left and right motors, first and second rate-of-turn sensors, and controller arranged to combine signals from the sensors in a manner that compensates for voltage offset errors. In another arrangement, the motorized wheelchair includes left and right drive wheels, left and right motors, first and second rate-of-turn sensors, input device, and controller arranged to combine signals from the sensors and input device in a manner that controls the motors using an integrated turn rate error. Several methods for controlling each wheelchair configuration are also provided. These methods process signals associated with desired, expected, or actual turn rate to determine if the wheelchair is off course.

30 Claims, 12 Drawing Sheets

U.S. PATENT DOCUMENTS

Figure 1:
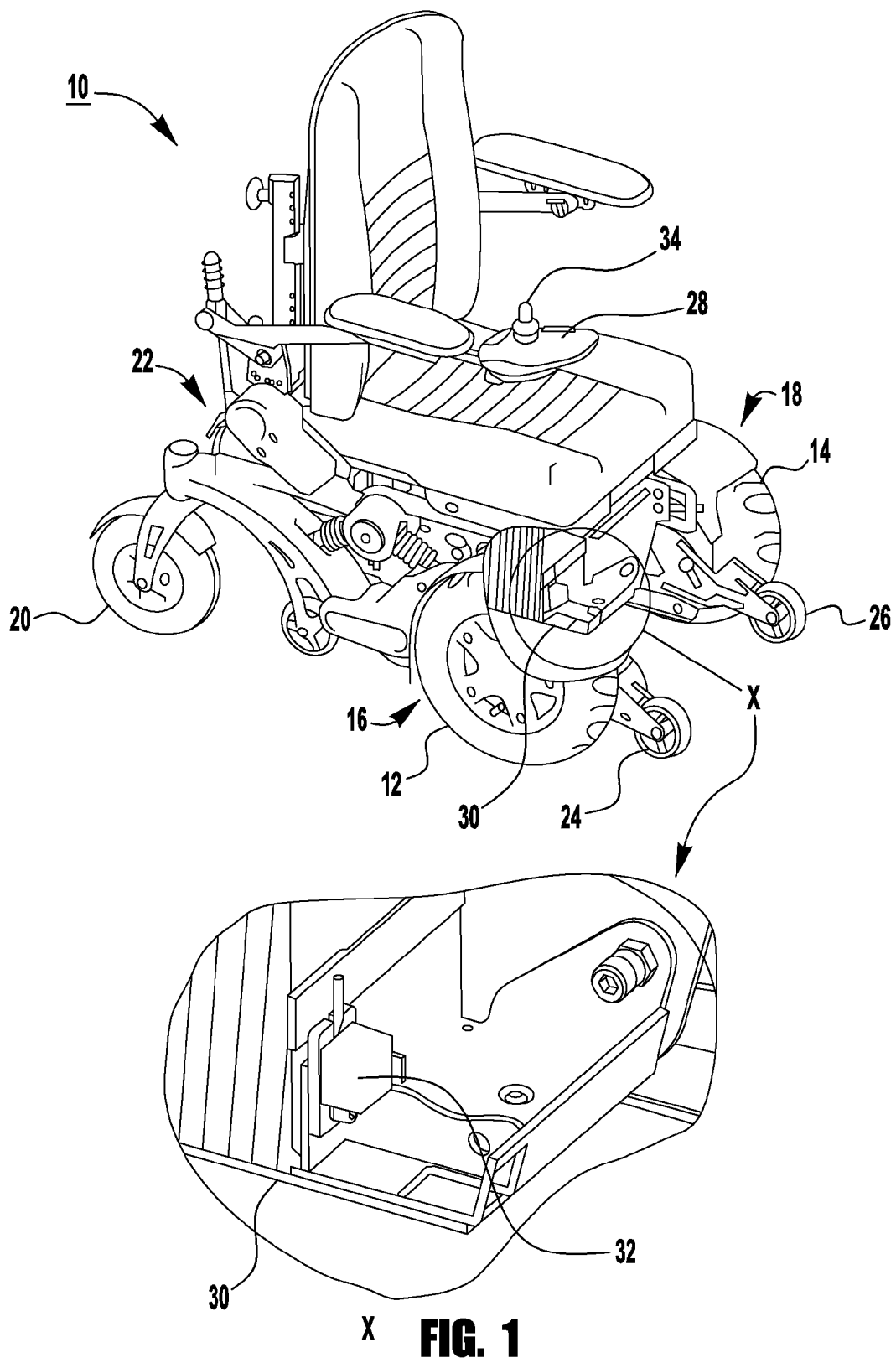

| | | | |
|---|---|---|---|
| 4,549,624 A | 10/1985 | Doman | |
| 4,556,940 A | 12/1985 | Katoo et al. | |
| 4,634,941 A | 1/1987 | Klimo | |
| 4,823,900 A * | 4/1989 | Farnam | 180/6.5 |
| 4,953,645 A | 9/1990 | Korber et al. | |
| 5,022,476 A | 6/1991 | Weege | |
| 5,065,612 A | 11/1991 | Ooka et al. | |
| 5,208,521 A | 5/1993 | Aoyama | |
| 5,219,212 A | 6/1993 | Shimada et al. | |
| 5,234,066 A | 8/1993 | Ahsing et al. | |
| 5,253,724 A | 10/1993 | Prior | |
| 5,270,959 A | 12/1993 | Matsuzaki et al. | |
| 5,278,424 A | 1/1994 | Kagawa | |
| 5,307,888 A | 5/1994 | Urvoy | |
| 5,366,036 A | 11/1994 | Perry | |
| 5,426,970 A | 6/1995 | Florida | |
| 5,512,904 A | 4/1996 | Bennett | |
| 5,699,256 A | 12/1997 | Shibuya et al. | |
| 5,701,965 A | 12/1997 | Kamen et al. | |
| 5,795,988 A | 8/1998 | Lo et al. | |
| 6,202,773 B1 * | 3/2001 | Richey et al. | 180/6.5 |
| 6,615,937 B2 | 9/2003 | Richey, II et al. | |
| 7,974,753 B2 | 7/2011 | Kuo et al. | |
| 8,315,770 B2 | 11/2012 | Strothmann | |
| 2001/0006125 A1 | 7/2001 | Richey et al. | |
| 2006/0066268 A1 | 3/2006 | Nora et al. | |

FOREIGN PATENT DOCUMENTS

| | | |
|---|---|---|
| DE | 4231821 | 3/1994 |
| DE | 3724161 | 12/1998 |
| EP | 324101 | 7/1989 |
| EP | 1541965 | 6/2005 |
| EP | 2 540 554 | 1/2013 |
| GB | 1092162 | 11/1967 |
| GB | 1103621 | 2/1968 |
| GB | 2043554 | 5/1983 |
| GB | 2218517 | 11/1989 |
| GB | 2342903 | 4/2000 |
| GB | 2352522 | 1/2001 |
| JP | 10314234 | 12/1998 |
| WO | 94/20235 | 9/1994 |
| WO | 01/08922 | 2/2001 |
| WO | 02/066281 | 8/2002 |
| WO | 2008/144082 | 11/2008 |

OTHER PUBLICATIONS

Response from U.S. Appl. No. 09/932,182 dated May 6, 2003.
Notice of Allowance from U.S. Appl. No. 09/932,182 dated May 19, 2003.
Notice of Allowance from U.S. Appl. No. 09/365,276 dated Nov. 21, 2000.
Office acton from U.S. Appl. No. 12/531,921 dated Feb. 17, 2012.
Response to Office Action from U.S. Appl. No. 12/531,921 dated May 17, 2012.
Notice of Allowance from US U.S. Appl. No. 12/531,921 dated Jun. 12, 2012.
Notice of Allowance from U.S. Appl. No. 12/531,921 dated Oct. 11, 2012.
International Search Report from PCT/US08/52579 dated Sep. 17, 2008.
International Search Report from PCT/US00/18563 dated Oct. 11, 2000.
International Search Report from PCT/US02/02639 dated Aug. 26, 2002.
Communication from EP Application No. 00943407.7 dated Jun. 21, 2005.
Response from EP Application No. 00943407.7 dated Dec. 21, 2005.
Communication from EP Application No. 00943407.7 dated Feb. 20, 2006.
Response from EP Application No. 00943407.7 dated Dec. 15, 2006.
Communication from EP Application No. 00943407.7 dated Mar. 27, 2007.
Response from EP Application No. 00943407.7 dated Sep. 27, 2007.
Communication from EP Application No. 00943407.7 dated Oct. 22, 2008.
Response from EP Application No. 00943407.7 dated Apr. 29, 2009.
Summons to Attend Oral Proceedings in EP Application No. 00943407.7 dated May 14, 2012.
Communication from EP Application No. 00943407.7 dated Aug. 21, 2012.
Communication from EP Application No. 00943407.7 dated Sep. 5, 2012.
Summons to Attend Oral Proceedings and related Communication from EP Application No. 00943407.7 dated Oct. 29, 2012.
Communication from EP Application No. 02703282.0 dated Mar. 26, 2007.
Response from EP Application No. 02703282.0 dated Sep. 26, 2007.
Response from EP Application No. 02703282.0 dated Dec. 3, 2008.
Communication from EP Application No. 02703282.0 dated Feb. 18, 2009.
Summons to Attend Oral Proceedings in EP Application No. 02703282.0 dated Oct. 14, 2011.
Response to Communication in EP Application No. 02703282.0 dated Jan. 30, 2012.
Opposition in EP Application No. 02703282.0 dated Jan. 30, 2012.
Response in EP Application No. 02703282.0 dated Feb. 2, 2012.
Minutes of Proceedings (Opposition Division) in EP Application No. 02703282.0 dated Mar. 30, 2012.
Decision in Opposition Division in EP Application No. 02703282.0 dated Mar. 30, 2012.
Communication from EP Application No. 02703282.0 dated Jul. 13, 2012.
Communication from EP Application No. 08728648.0 dated Nov. 13, 2009.
Response to Communication from EP Application No. 08728648.0 dated Dec. 22, 2009.
Communication from EP Application No. 08728648.0 dated Jun. 4, 2010.
Response to Communication from EP Application No. 08728648.0 dated Dec. 14, 2010.
Summons to Attend Oral Proceedings in EP Application No. 08728648.0 dated Mar. 30, 2012.
Written Submissions for EP Application No. 08728648.0 dated Aug. 3, 2012.
Communication cancelling Oral Proceedings in EP Application No. 08728648.0 dated Aug. 30, 2012.
Communication (Result of Consultation) in EP Application No. 08728648.0 dated Sep. 7, 2012.
Communication from EP Application No. 08728648.0 dated Sep. 14, 2012.
Communication from EP Application No. 12171944.7 dated Jul. 12, 2012.
Response to Communication from EP Application No. 12171944.7 dated Sep. 12, 2012.
Communication from EP Application No. 12171949.6 dated Jul. 12, 2012.
Response to Communication from EP Application No. 12171949.6 dated Sep. 12, 2012.
Examination Report from New Zealand Patent Application No. 579776 dated Mar. 10, 2011.
Examination Report from New Zealand Patent Application No. 579776 and Notice of Acceptance dated Aug. 20, 2012.
Barshan et al., "An inertial navigation system for a mobile robot", Intelligent Robots and Systems '93, vol. 3, Jul. 26, 1993, pp. 2243-2248.
Borenstein, et al., "Where am I? Sensors and Methods for Mobile Robot Positioning", The University of Michigan, pp. 1, 2, 4-11, 31-64, Apr. 1996.
Bradley, "Transducers for Motion Control", Motion Control for Intelligent Automation, Oct. 27-29, 1992, Perugia, Italy, pp. 24-56.
Collins, Timothy J. and James J. Kauzlarich, "Directional instability of rear caster wheelchairs", Journal of Rehabilitation Research and Development, vol. 25, No. 3, pp. 1-18 dated Summer 1988.
Cooper, R.A. "Intelligent Control of Power Wheelchairs", IEEE Engineering in Medicine & Biology Magazine, vol. 14, No. 4, Jul./Aug. 1995, pp. 423-430, NY, U.S.

Moore, James W., Wheelchair Directional Control, Digital and Analog Simulation, IEEE Engineering in Medicine and Biology 10th International Conference dated 1988.

Prassler, et al., "Maid: Mobility Assistance for Elderly and Disabled People", IEEE, No. 0-7803-4503-7198, pp. 2493-2498 (1998).

Shung et al., "Feedback Control and Simulation of a Wheelchair", ASME J. of Dynamic Systems, Measurement and Control, vol. 105, pp. 96-100, Jun. 1983.

Strobel "Navigation in Partially Unknown, Narrow, Cluttered Space", ,Proceedings of the 1999 IEEE, Int'l Conference on Robotics & Automation, Detroit, MI—May 1999, pp. 29-34.

Von Der Hardt, et al., "The dead reckoning localization system of the wheeled mobile robot", Romane' Multisensor Fusion and Integration of Intelligent Systems 08, Dec. 1996, New York, NY, USA, IEEE, pp. 603-610.

Select pages (pp. 315-323) from the book "Rehabilitation Engineering Applied to Mobility and Manipulation", Rory A. Cooper, published 1995 by Taylor & Francis Group, LLC, ISBN-13:978-0750303439.

Operating Manual for "DX Dolphin Remote (DX-REM 34) Installation Manual" No. 60025 dated Jan. 5, 1999.

"510(k) Summary, Invacare Corporation's Models Action Storm Ranger II and Power 9000 Front Wheel Drive Power Wheelchairs" dated Oct. 5, 1998.

"Guidance Document for the Preparation of Premarket Notification [510(K)] Applications for Mechanical and Powered Wheelchairs, and Motorized Three-Wheeled Vehicles", US Department of Health and Human Services, Rockville, MD Jul. 26, 1995.

"Guidance for FDA Reviewers and Industry—Guidance for the Content of Premarket Submissions for Software Contained in Medical Devices", US Department of Health and Human Services, May 29, 1998.

Search Report from EP Application No. 12171949.6 dated Nov. 19, 2012.

Communication from EP Application No. 12171949.6 dated Jan. 7, 2013.

Communication from EP Application No. 12171944.7 dated Jan. 14, 2013.

Decision to Refuse Patent Application in EP Application No. 00943407.7 dated Jan. 31, 2013.

First Examination Report for AU Application No. 2008254446 dated Jan. 31, 2013.

Decision to Grant Patent in EP Application No. 08728648.0 dated Feb. 7, 2013.

* cited by examiner

MOTORIZED WHEELCHAIR

CROSS-REFERENCE TO RELATED APPLICATIONS

This application is a continuation of U.S. patent application Ser. No. 12/531,921, now U.S. Pat. No. 8,315,770, filed Sep. 18, 2009, which is a U.S. national phase entry of PCT/US2008/052579 with an international filing date of Jan. 31, 2008, which claims priority to, and any other benefit of, European Patent Application No. EP 07104438.2, filed Mar. 19, 2007, and U.S. Provisional Patent Application Ser. No. 60/988,918, filed Nov. 19, 2007. The contents of all above-identified patent applications are fully incorporated herein by reference.

BACKGROUND

Exemplary stability problems of motorized wheelchairs have been discussed in U.S. Pat. No. 6,202,773 and U.S. Pat. No. 6,615,937 with examples of typical front- and rear-wheel driven wheelchairs. As stated in these patents, on the one hand, rear-wheel driven wheelchairs are generally more stable than front-wheel driven wheelchairs, which allow for higher maximum speeds than the former. On the other hand, front-wheel driven wheelchairs generally have the advantage of better maneuverability and allow a user to get closer to an object, for example, in front of the wheelchair user. In general terms, rear-wheel driven wheelchairs are considered to be advantageous for outdoor use, where stability and high speed are preferred, while front-wheel driven wheelchairs are the preferred vehicle for indoor use.

In certain circumstances, wheelchairs can experience stability problems such as skidding, spinning out, or tipping due to loss of traction. Loss of traction can result from effecting a sharp curve while driving at high speed, for example. Furthermore, loss of traction may be observed when the surface is in some way slippery, for example, on a wet track, an icy surface, or sandy or dusty roads. A risk following loss of traction, particularly with front-wheel driven wheelchairs, is a spin-out or breakout which may cause the vehicle to suddenly and violently turn and sometimes spinout. This may leave the wheelchair facing in a different direction than when the spin-out started and may cause the wheelchair to tip over. A common way of dealing with this is to limit the speed of such wheelchairs.

A typical stability problem encountered with motorized wheelchairs is veering off course. For purposes of this application, "veering" refers to the wheelchair being off course from a desired course indicated by an input device for the wheelchair. In this manner of speaking, veering may be distinguished from loss of traction for purposes of determining whether the wheelchair is off course and subsequent measures to be implemented. Veer, for example, may occur when driving along a slope. Rear-wheel driven wheelchairs have a tendency of veering downwards instead of, for example, maintaining a straight path perpendicular to the slope. Front-wheel driven wheelchairs tend to veer upwards with respect to the slope. More generally, veering may occur when an external force acts on the wheelchair and thus changes the route the user has indicated via an input device. For example, wind blowing in a cross direction to a wheelchair's driving direction may also cause veering.

In U.S. Pat. No. 6,202,773 and U.S. Pat. No. 6,615,937, which are hereby incorporated by reference in their entirety, a rate-of-turn sensor (such as a gyroscope, an angular rate sensor (e.g., piezoelectric ceramic gyro, model no. CG-16D by TOKIN America), or a combination of accelerometers) is provided to sense or determine an actual turn rate of the wheelchair. The controller for the wheelchair may detect veering by assessing the difference between, for example, a turn rate command and the actual turn rate. Accordingly, inputs from the user's command input device and from the rate-of-turn sensor are compared in order to determine if the wheelchair's actual course is different from the desired course. In case of a difference, the wheelchair's speed may be limited and/or the turn rate may be limited or corrected. U.S. Pat. No. 6,615,937 illustrates a system that includes a second rate-of-turn sensor to detect failure of the first rate-of-turn sensor by comparing the outputs of each rate-of-turn sensor to one another. A failure of the first rate-of-turn sensor can be determined by a change in this comparison.

In U.S. Pat. No. 6,202,773 and U.S. Pat. No. 6,615,937 it is noted that an offset voltage associated with the rate-of-turn sensor may vary with temperature. These patents teach a controller that can determine the offset voltage to correct for temperature offset in the rate-of-turn sensor when the wheelchair is at rest. Temperature changes occurring while the wheelchair is being driven may cause an offset voltage error that may be corrected by the controller the next time the wheelchair is at rest.

SUMMARY

In one aspect, a motorized wheelchair is provided. In one exemplary embodiment, the motorized wheelchair includes left and right drive wheels connected to and providing rolling support for said motorized wheelchair, a left motor in operative communication with the left drive wheel, a right motor in operative communication with the right drive wheel, a first rate-of-turn sensor arranged to provide a first signal related to an actual turn rate of the motorized wheelchair, a first speed sensor arranged to provide a second signal related to a speed of said left drive wheel, a second speed sensor arranged to provide a third signal related to a speed of said right drive wheel, and a controller in operative communication with the left and right motors, first rate-of-turn sensor, and said first and second speed sensors, said controller arranged to independently control the left and right motors to drive the left and right drive wheels based at least in part on operator manipulation of one or more input devices, said controller also arranged to combine the first, second, and third signals to detect drift.

In another exemplary embodiment, the motorized wheelchair includes left and right drive wheels connected to and providing rolling support for said motorized wheelchair, a left motor in operative communication with the left drive wheel, a right motor in operative communication with the right drive wheel, a first rate-of-turn sensor arranged to provide a first signal related to an actual turn rate of the motorized wheelchair, a second rate-of-turn sensor arranged to provide a second signal related to the actual turn rate, wherein the second rate-of-turn sensor is flipped 180 degrees in relation to the first rate-of-turn sensor such that values for the first and second signals are on opposite sides of a value for a zero turn rate, and a controller in operative communication with the left and right motors and the first and second rate-of-turn sensors, said controller arranged to independently control the left and right motors to drive the left and right drive wheels based at least in part on operator manipulation of one or more input devices associated with an input device, said controller also arranged to combine the first and second signals in a manner that dynamically compensates the actual turn rate for voltage offset errors in the first and second signals induced by one or more external parameters to provide a compensated actual turn rate during operation of the motorized wheelchair.

In yet another exemplary embodiment, the motorized wheelchair includes left and right drive wheels connected to and providing rolling support for said motorized wheelchair, a left motor in operative communication with the left drive wheel, a right motor in operative communication with the right drive wheel, a first rate-of-turn sensor arranged to provide a first signal related to an actual turn rate of the motorized wheelchair, one or more input devices arranged to provide turn rate and linear speed command signals based at least in part on operator manipulation of the one or more input devices, the turn rate command signal being related to a desired turn rate of the motorized wheelchair, and a controller in operative communication with the left and right motors, first rate-of-turn sensor, and the one or more input devices, said controller arranged to independently control the left and right motors to drive the left and right drive wheels based at least in part on the operator manipulation of the one or more input devices, said controller also arranged to combine the first signal and the turn rate command signal in a manner that provides a turn rate error related to a difference between the actual turn rate and the desired turn rate and to integrate said turn rate error over time to provide an integrated turn rate error, said controller further arranged to adjust control of the left and right motors to compensate for the integrated turn rate error.

In another aspect, a method of controlling a motorized wheelchair is provided. In one exemplary embodiment, the method includes a) independently controlling left and right motors to drive corresponding left and right drive wheels based at least in part on operator manipulation of one or more input devices associated with an input device, b) sensing a first parameter and providing a first signal related to a speed of said left drive wheel, c) sensing a second parameter and providing a second signal related to a speed of said right drive wheel, d) sensing a third parameter using a first rate-of-turn sensor and providing a third signal related to an actual turn rate of the motorized wheelchair, and e) combining the first, second, and third signals to detect drift.

In another exemplary embodiment, the method includes a) independently controlling left and right motors to drive corresponding left and right drive wheels based at least in part on operator manipulation of one or more input devices associated with an input device, b) sensing a first parameter using a first rate-of-turn sensor and providing a first signal related to an actual turn rate of the motorized wheelchair, c) sensing the first parameter using a second rate-of-turn sensor and providing a second signal related to the actual turn rate, wherein the second rate-of-turn sensor is flipped 180 degrees in relation to the first rate-of-turn sensor such that values for the first and second signals are on opposite sides of a value for a zero turn rate, and d) combining the first and second signals in a manner that provides a value for the actual turn rate that is dynamically compensated for voltage offsets in the first and second signals induced by one or more external parameters during operation of the motorized wheelchair.

In yet another exemplary embodiment, the method includes a) receiving turn rate and linear speed command signals based at least in part on operator manipulation of one or more input devices associated with an input device, the turn rate command signal related to a desired turn rate of the motorized wheelchair, b) independently controlling left and right motors to drive corresponding left and right drive wheels based at least in part on the operator manipulation of the one or more input devices, c) sensing a first parameter using a first rate-of-turn sensor and providing a first signal related to an actual turn rate of the motorized wheelchair, d) combining the first signal and the turn rate command signal in a manner that provides a turn rate error related to a difference between the actual turn rate and the desired turn rate, e) integrating the turn rate error over time to provide an integrated turn rate error, and f) adjusting control of the left and right motors to compensate for the integrated turn rate error.

In yet another aspect, a drive control device for a vehicle comprising left and right drive wheels is provided. In one exemplary embodiment, the drive control device includes a controller in operative communication with an input device and a first rate-of-turn sensor, wherein said first rate-of-turn sensor is provided for sensing an actual turn rate of the vehicle, wherein a first speed sensor is arranged to provide a first signal related to a speed of the left drive wheel, wherein a second speed sensor is arranged to provide a second signal related to a speed of the right drive wheel, wherein the controller is arranged to detect drift due to loss of traction of at least one of the left or right drive wheels by processing the actual turn rate with the first and second signals.

DRAWINGS

These and other features, aspects, and advantages of the present invention will become better understood with regard to the accompanying drawings, following description, and appended claims.

Figure 2A:
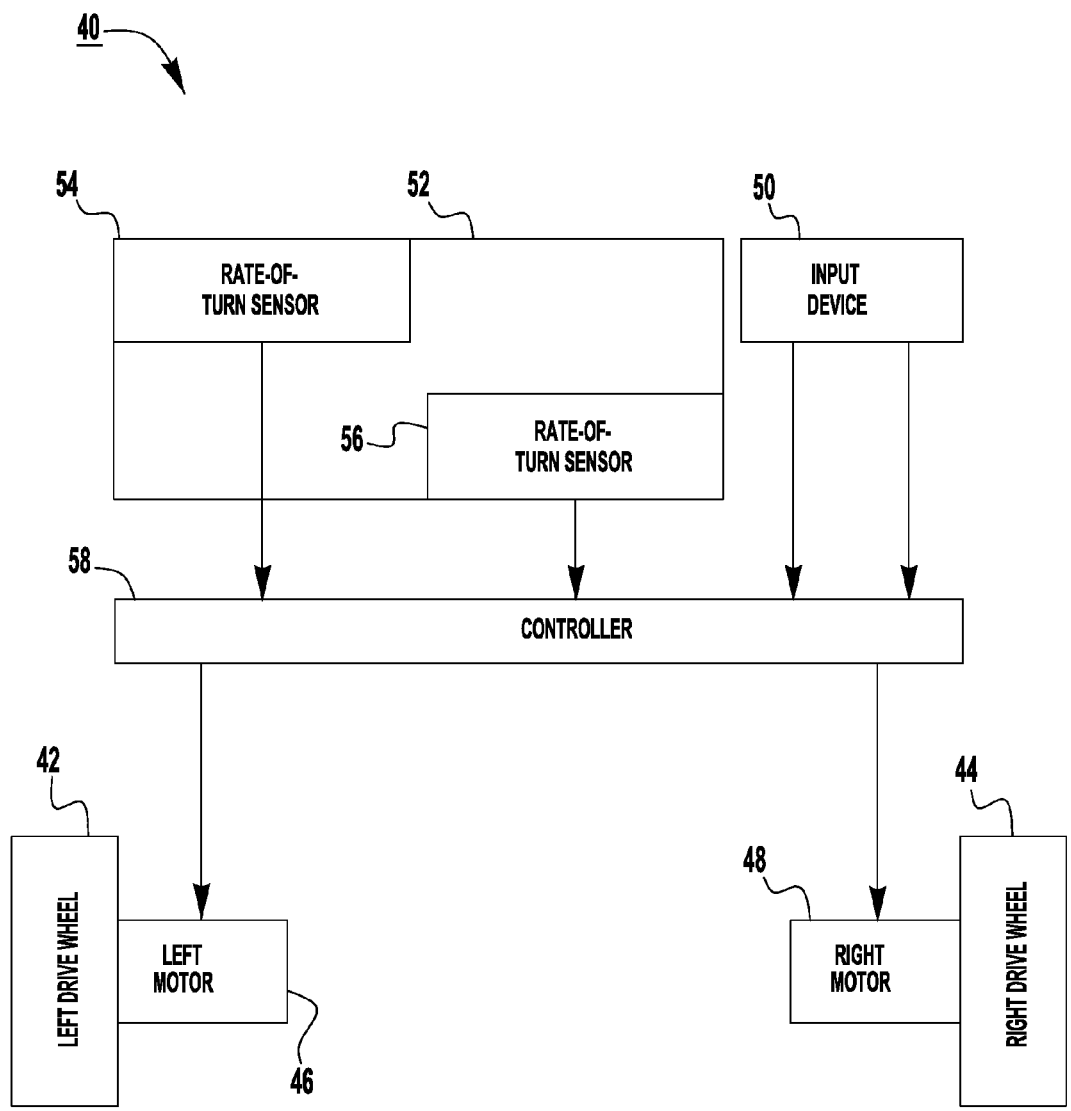
Figure 2B:
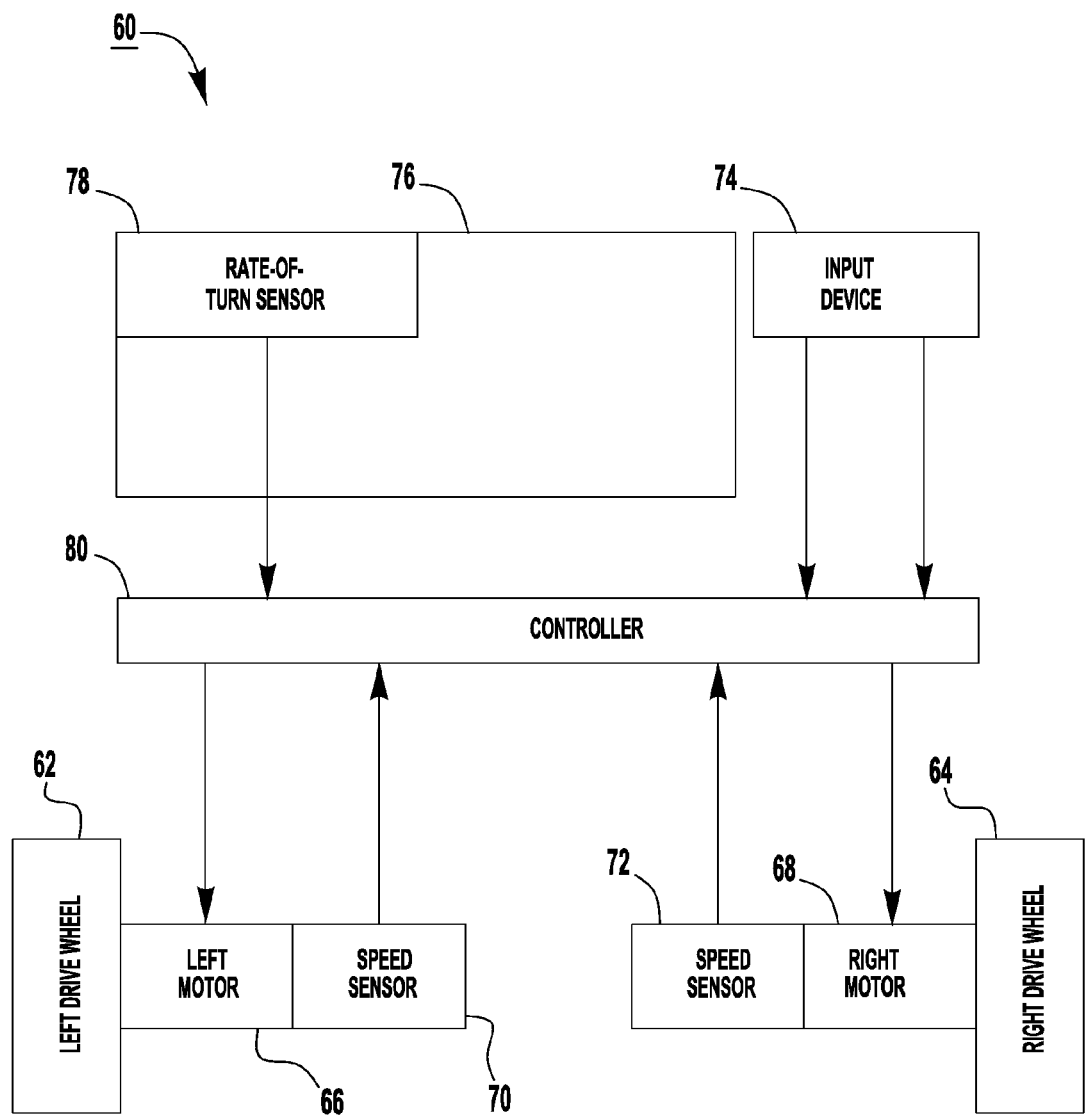
Figure 2C:
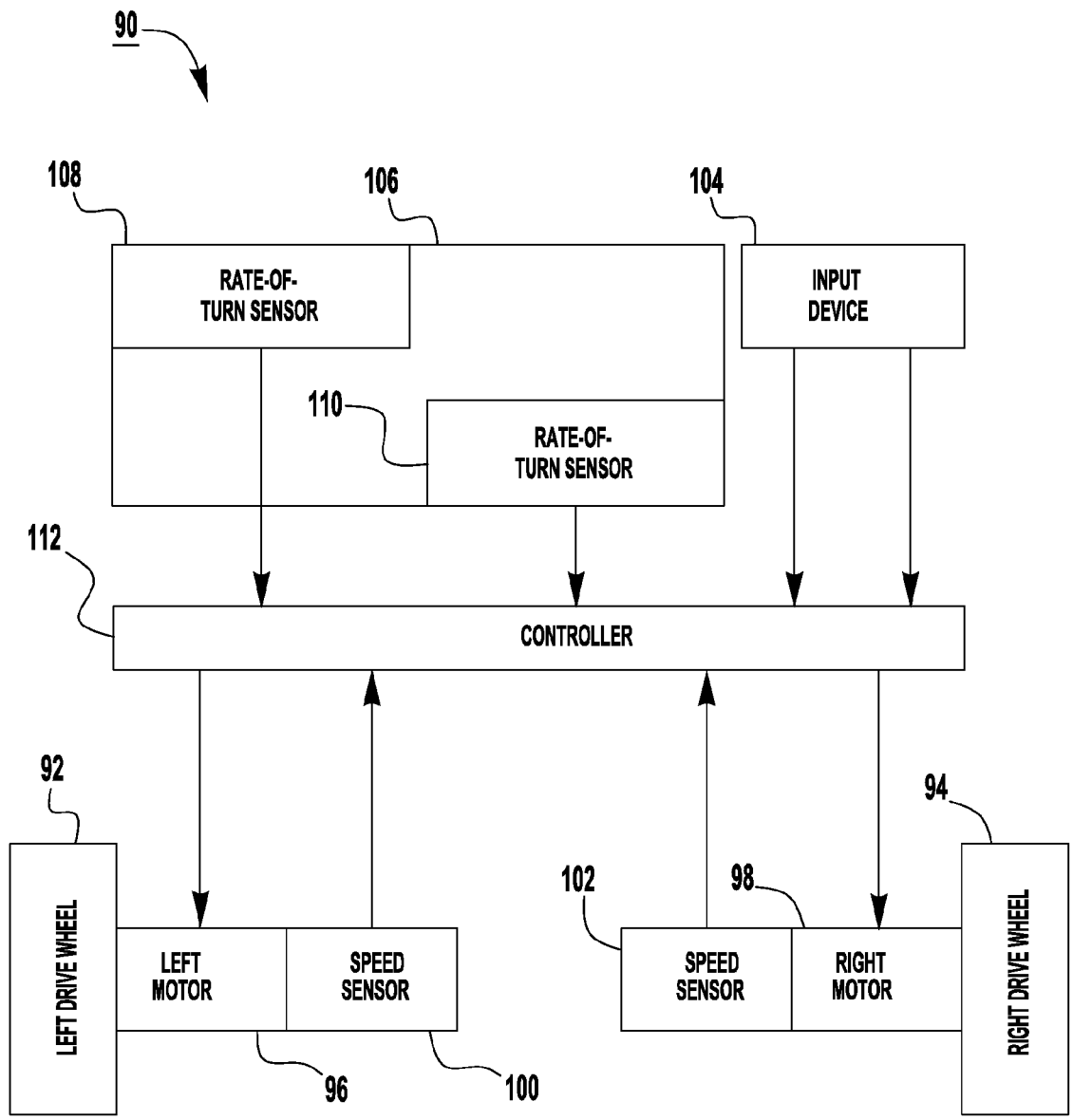
Figure 3A:
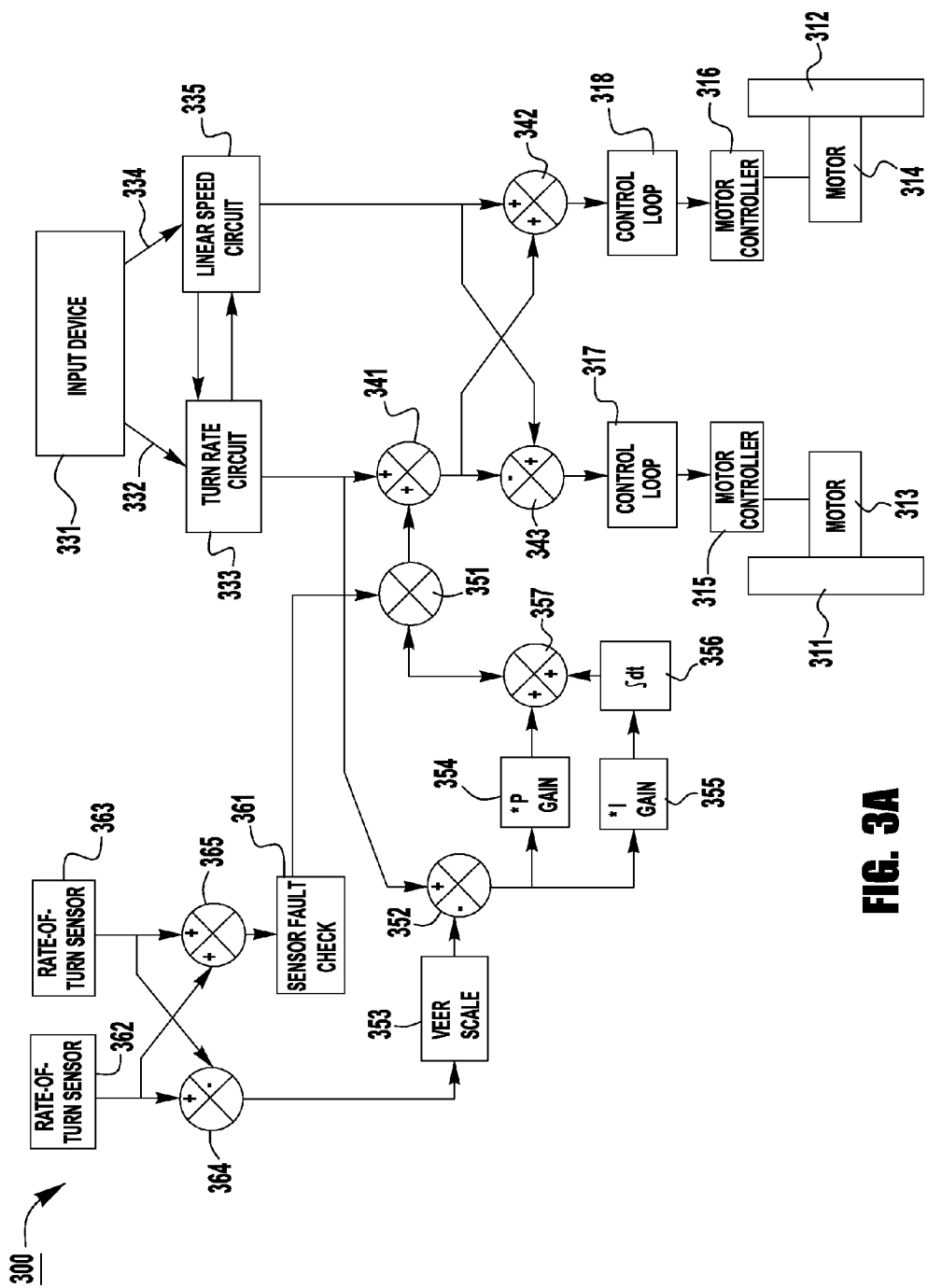
Figure 3B:
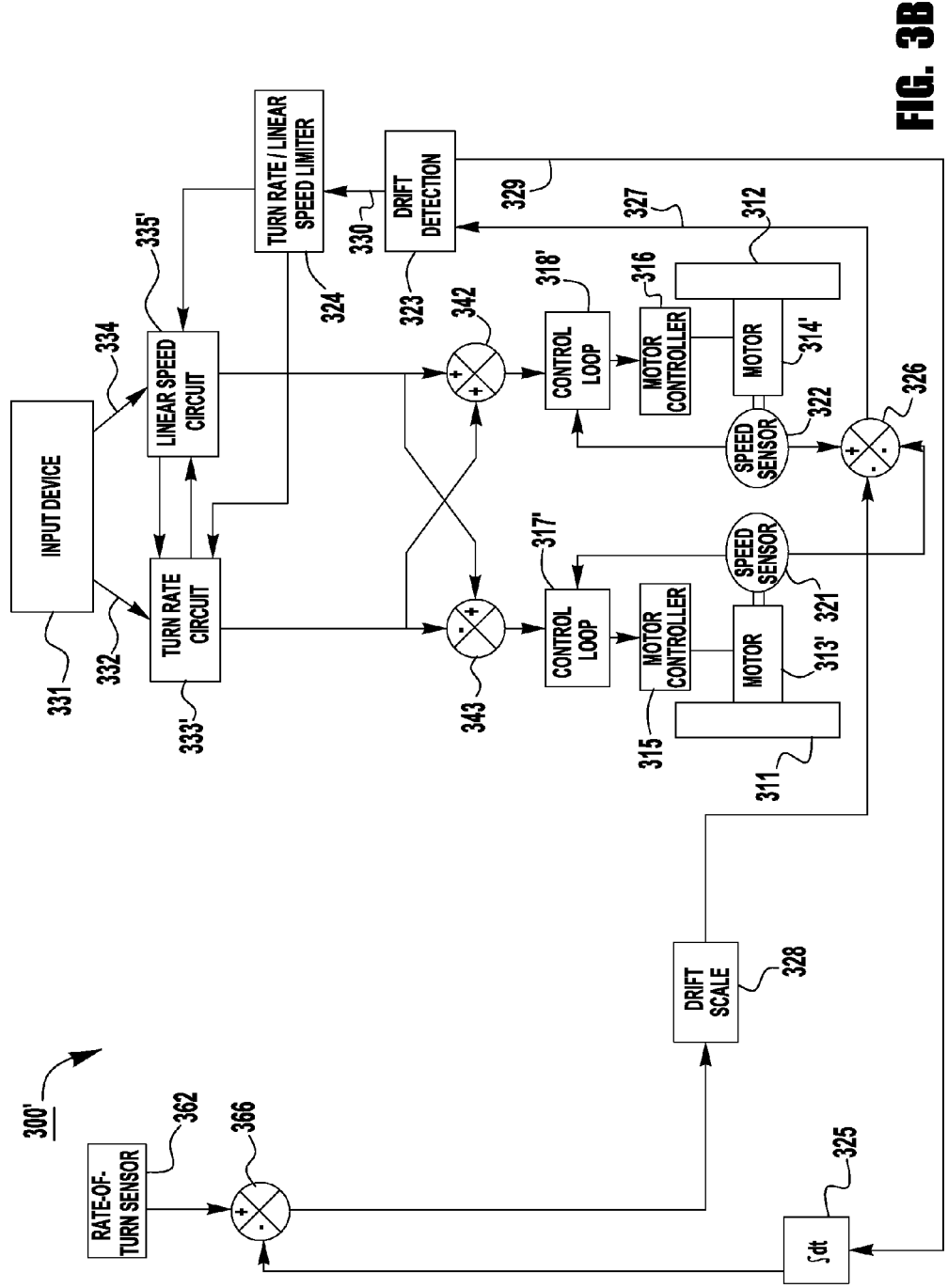
Figure 3C:
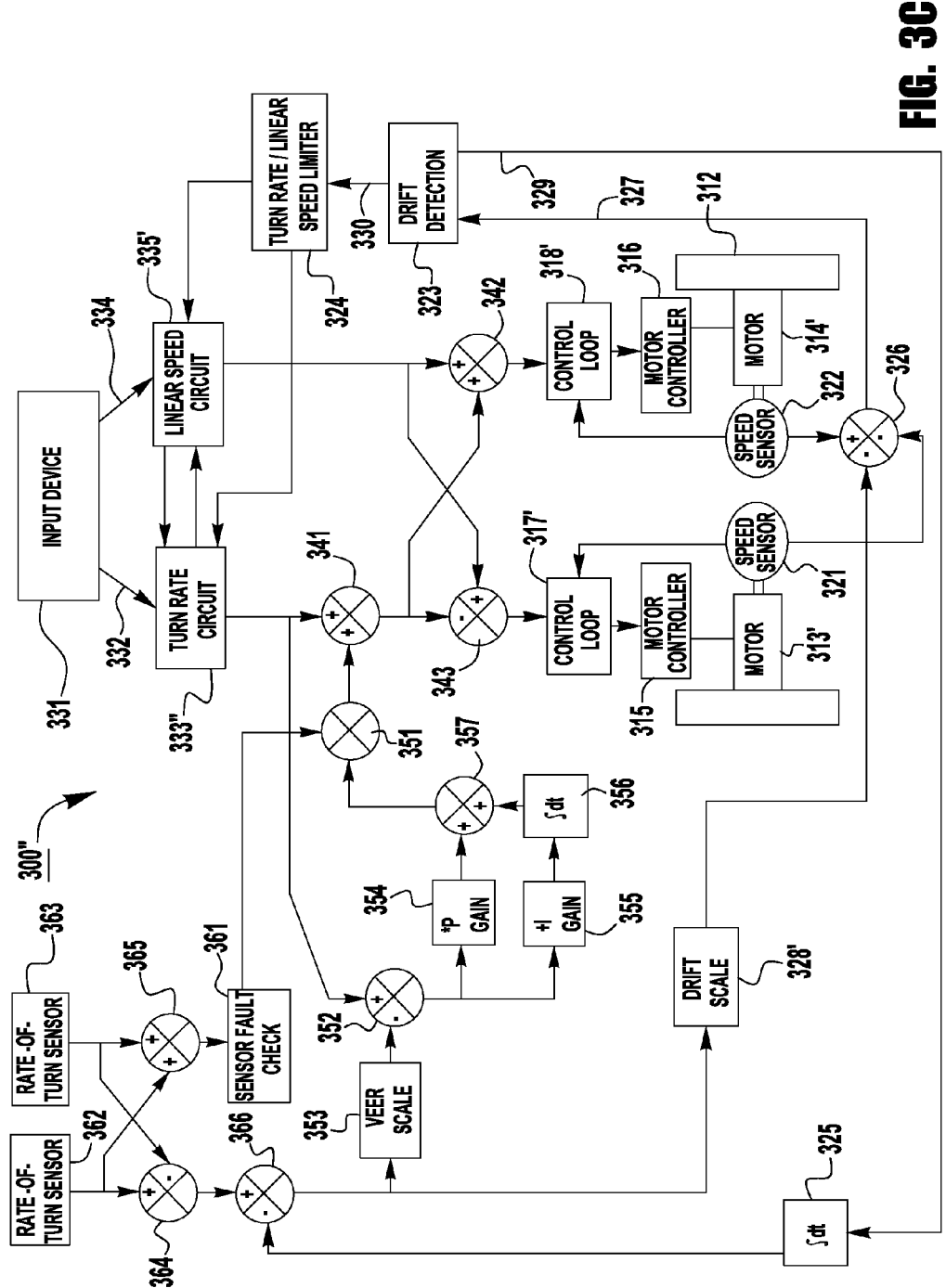
Figure 4:
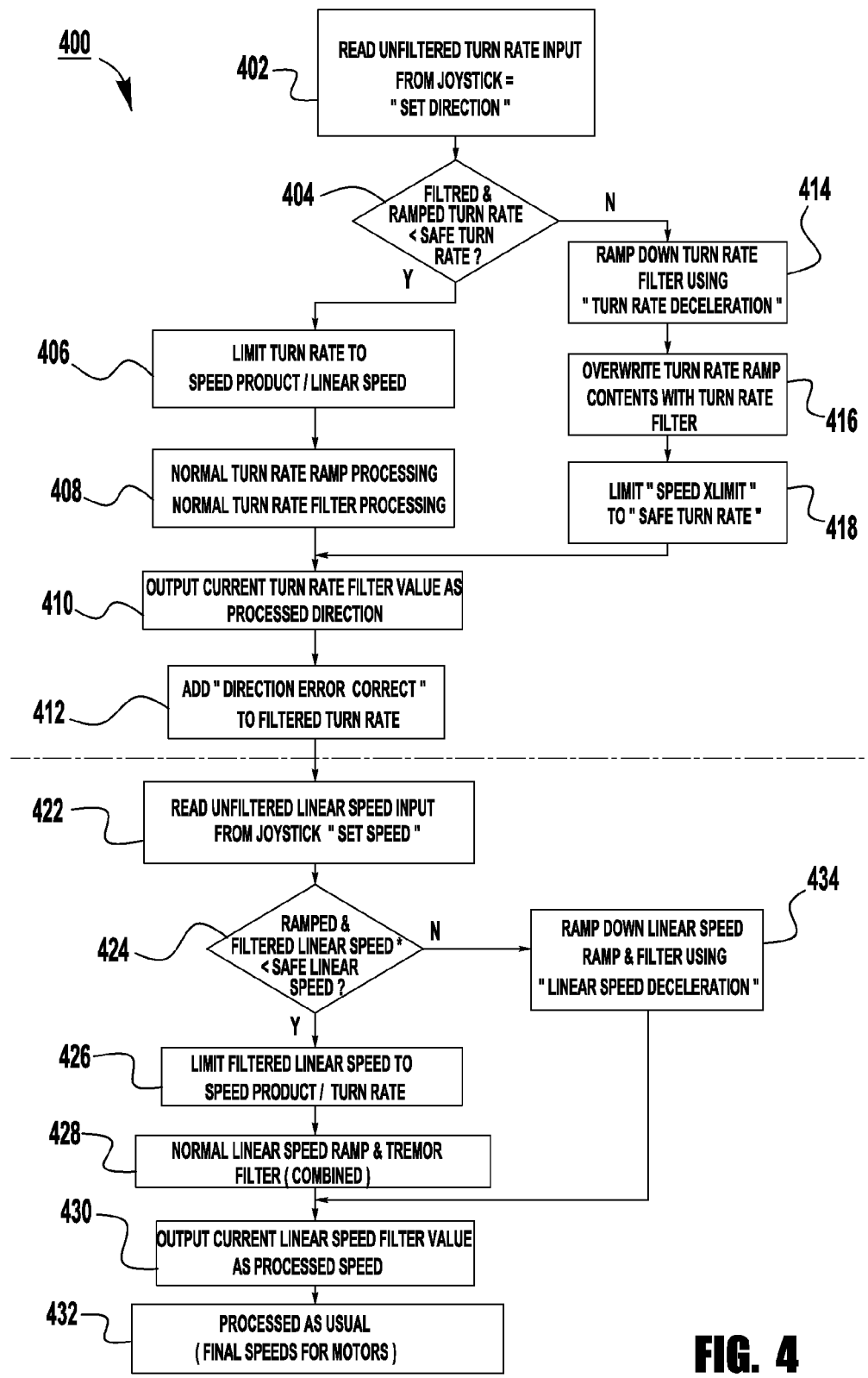
Figure 5:
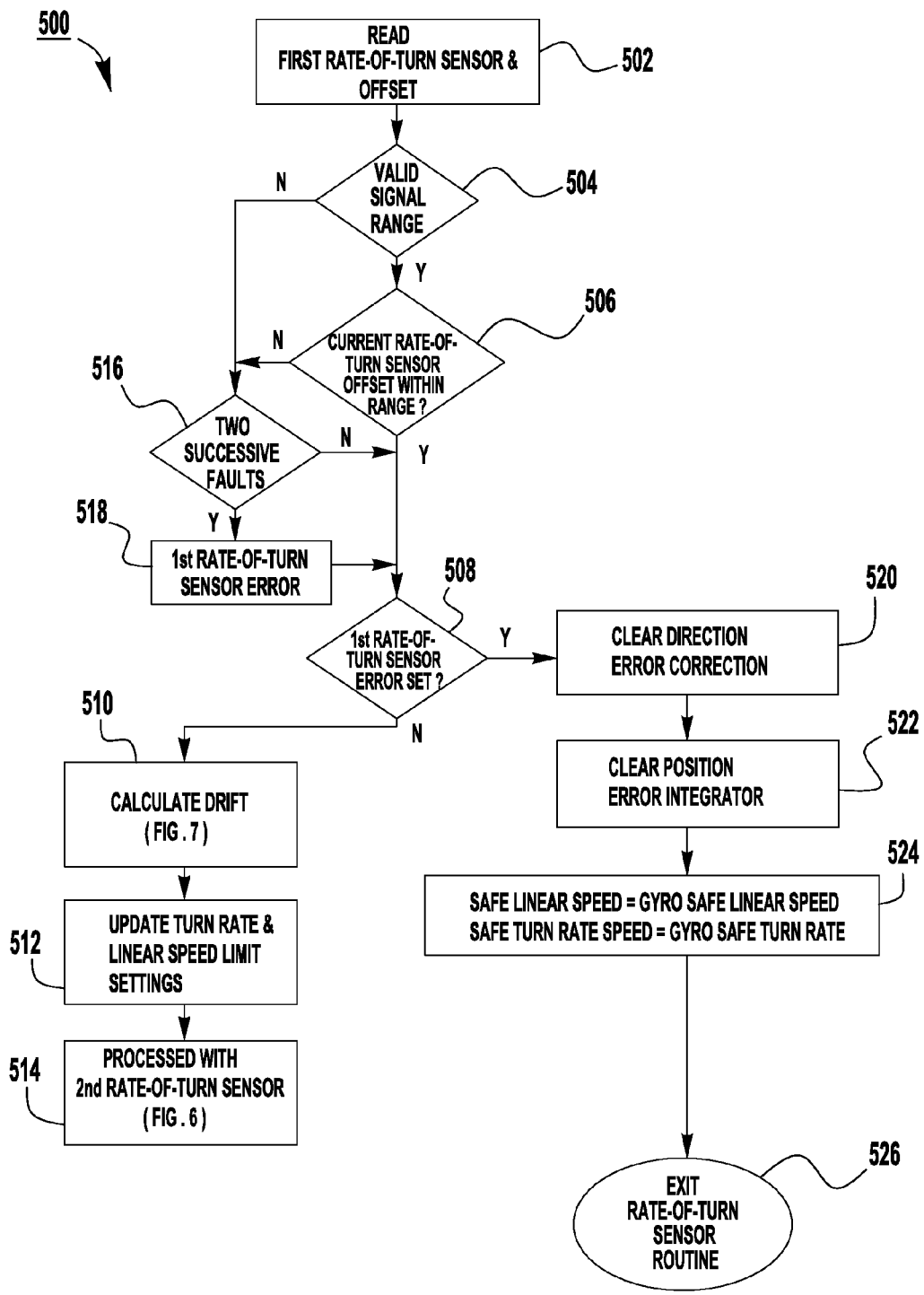
Figure 6:
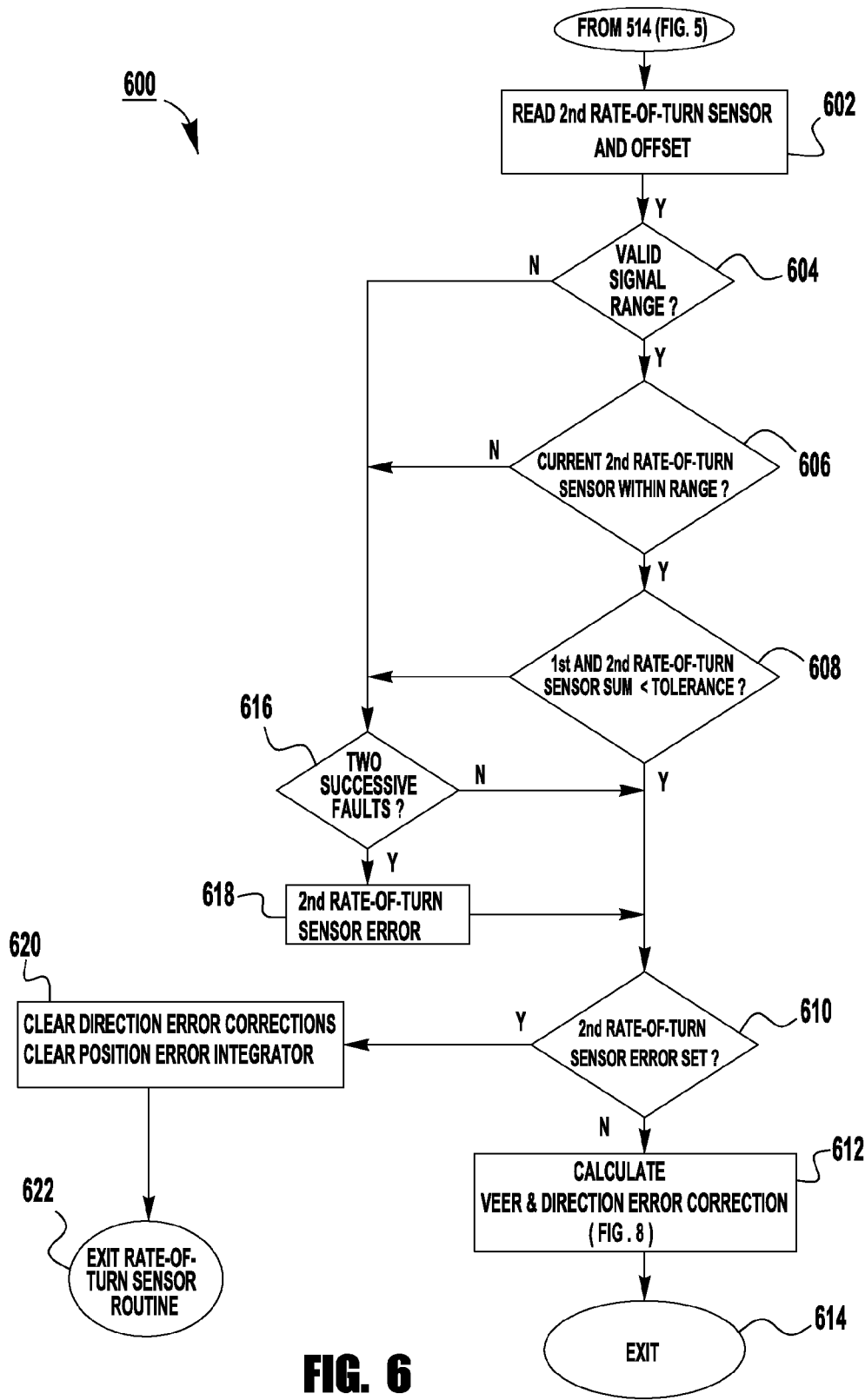
Figure 7:
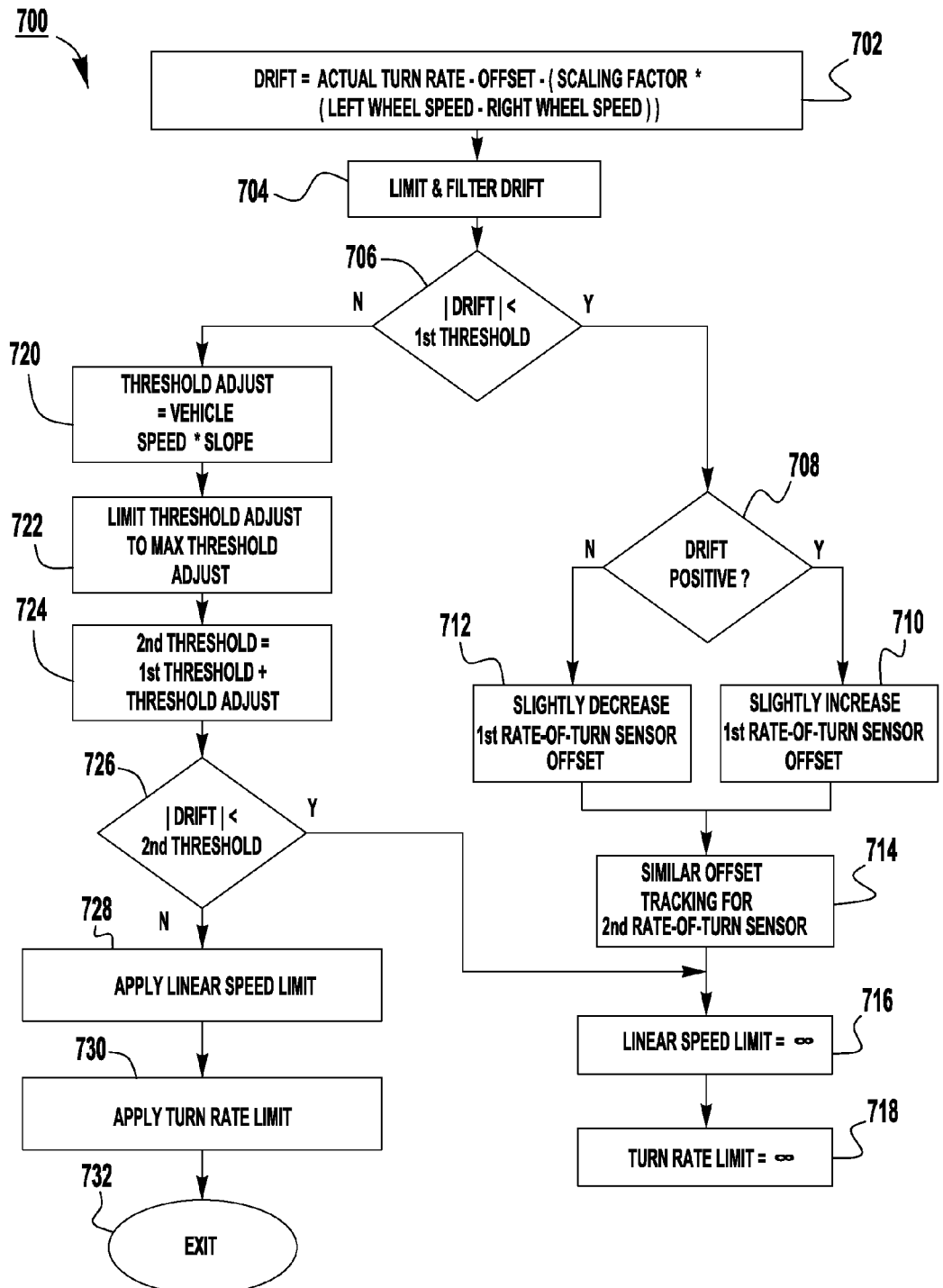
Figure 8:
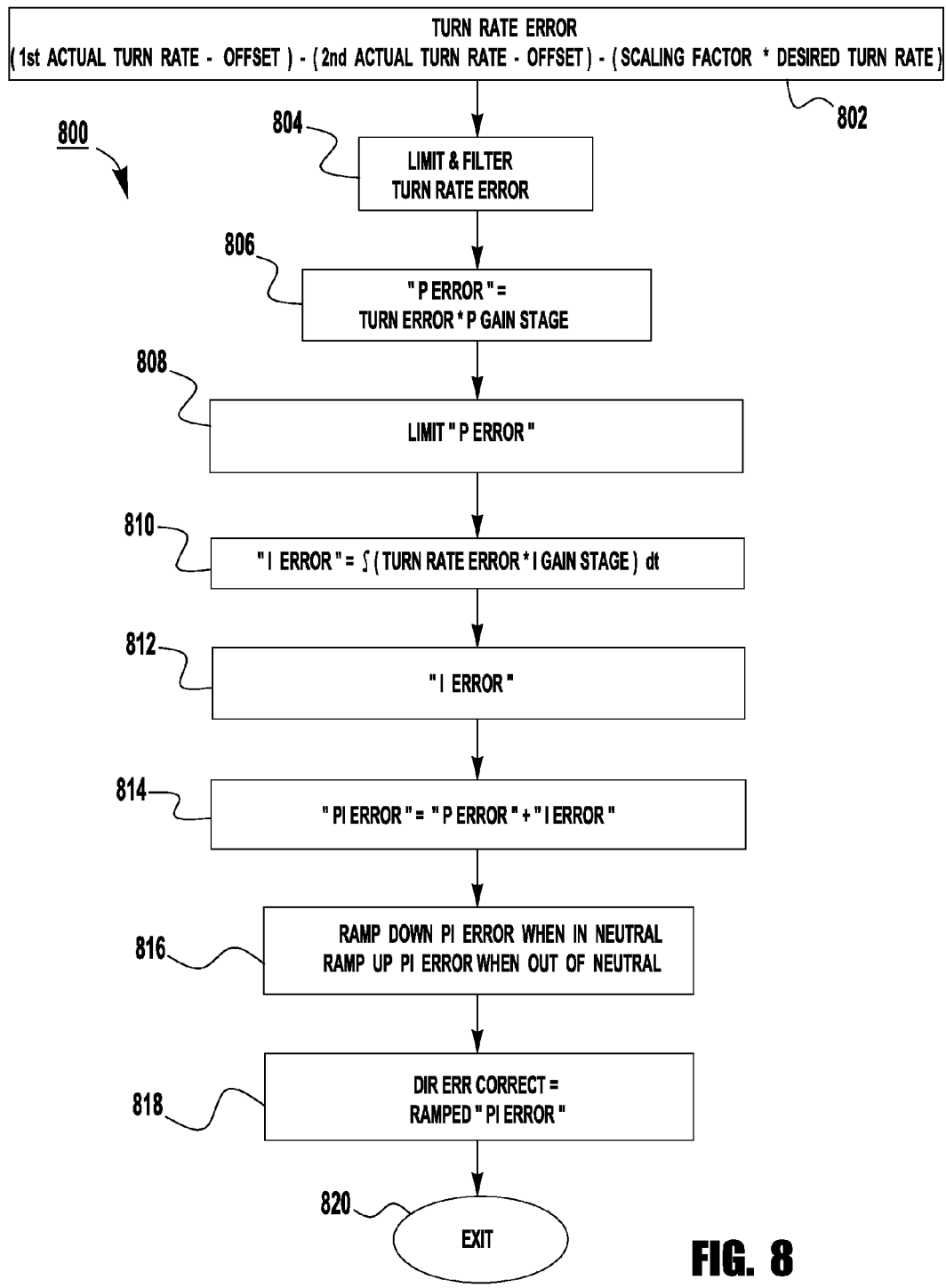

FIG. 1 is a perspective view of an exemplary embodiment of an exemplary motorized wheelchair according to the invention, FIG. 2A is a functional block diagram of an exemplary embodiment of an exemplary motorized wheelchair according to the invention, FIG. 2B is a functional block diagram of another exemplary embodiment of an exemplary motorized wheelchair according to the invention, FIG. 2C is a functional block diagram of still another exemplary embodiment of an exemplary motorized wheelchair according to the invention, FIG. 3A is a more detailed functional block diagram of an exemplary embodiment of an exemplary motorized wheelchair according to the invention, FIG. 3B is a more detailed functional block diagram of another exemplary embodiment of an exemplary motorized wheelchair according to the invention, FIG. 3C is a more detailed functional block diagram of still another exemplary embodiment of an exemplary motorized wheelchair according to the invention, FIG. 4 is a flowchart for an exemplary embodiment of a fast control loop of an exemplary motorized wheelchair, FIG. 5 is a flowchart for an exemplary embodiment of a process for processing an actual turn rate signal from a first rate-of-turn sensor in conjunction with controlling an exemplary motorized wheelchair and providing drift detection and intervention, FIG. 6 is a flowchart for an exemplary embodiment of a process for processing an actual turn rate signal from first and second rate-of-turn sensors in conjunction with controlling an exemplary motorized wheelchair and providing veer compensation, FIG. 7 is a flowchart for an exemplary embodiment of a process for drift detection and intervention in conjunction with controlling an exemplary motorized wheelchair, and FIG. 8 is a flowchart for an exemplary embodiment of a process for veer detection and compensation in conjunction with controlling an exemplary motorized wheelchair.

DESCRIPTION

The following paragraphs include definitions of exemplary terms used within this disclosure. Except where noted otherwise, variants of all terms, including singular font's, plural forms, and other affixed forms, fall within each exemplary term meaning. Except where noted otherwise, capitalized and non-capitalized forms of all terms fall within each meaning.

"Circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or another programmed logic device. Additionally, a circuit may include a sensor, detector, or emitter/detector combination. A circuit may utilize analog or digital technology and may convert signals from analog to digital and vice versa. A circuit may also be fully embodied as software. As used herein, circuit is considered synonymous with logic.

"Comprising," "containing," "having," and "including," as used herein, except where noted otherwise, are synonymous and open-ended. In other words, usage of any of these terms (or variants thereof) does not exclude one or more additional elements or method steps from being added in combination with one or more delineated elements or method steps.

"Computer communication," as used herein includes, but is not limited to, a communication between two or more computer components and can be, for example, a network transfer, a file transfer, an applet transfer, an email, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer component," as used herein includes, but is not limited to, a computer-related entity, either hardware, firmware, software, a combination thereof, or software in execution. For example, a computer component can be, but is not limited to being, a processor, an object, an executable, a process running on a processor, a thread of execution, a program and a computer. By way of illustration, both an application running on a server and the server can be computer components. One or more computer components can reside within a process or thread of execution and a computer component can be localized on one computer or distributed between two or more computers.

"Controller," as used herein includes, but is not limited to, any circuit or device that coordinates and controls the operation of one or more input or output devices. For example, a controller can include a device having one or more processors, microprocessors, or central processing units (CPUs) capable of being programmed to perform input or output functions. A controller may also include a state machine or a control unit. A controller may utilize analog or digital technology and may convert signals from analog to digital and vice versa.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may utilize analog or digital technology and may convert signals from analog to digital and vice versa. Logic may also be fully embodied as software. Additionally, logic may include a sensor, detector, or emitter/detector combination. As used herein, logic is considered synonymous with circuit.

"Measurement," as used herein includes, but is not limited to, an extent, magnitude, size, capacity, amount, dimension, characteristic, or quantity ascertained by estimating or appraising a physical quantity, property, characteristic, condition, criterion, or other metric. Example measurements may be provided, but such examples are not intended to limit the scope of measurements that the systems and methods described herein can employ.

"Operable connection" (or a connection by which entities are operably connected), as used herein includes, but is not limited to, a connection in which signals, physical communication flow, or logical communication flow may be sent or received. Usually, an operable connection includes a physical interface, an electrical interface, or a data interface, but an operable connection may include differing combinations of these or other types of connections sufficient to allow operable control.

"Operative communication," as used herein includes, but is not limited to, a communicative relationship between devices, logic, or circuits, including mechanical and pneumatic relationships. Direct and indirect electrical, electromagnetic, and optical connections are examples of connections that facilitate operative communications. Linkages, gears, chains, belts, push rods, earns, keys, attaching hardware, and other components contributing to mechanical relations between items are examples of components facilitating operative communications. Pneumatic devices and interconnecting pneumatic tubing may also contribute to operative communications. Two devices are in operative communication if an action from one causes an effect in the other, regardless of whether the action is modified by some other device. For example, two devices in operative communication may be separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) IEEE 802.11 communications links, xi) satellite communication links, and xii) other wireless communication links. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Or," as used herein, except where noted otherwise, is inclusive, rather than exclusive. In other words, "or' is used to describe a list of alternative things in which one may choose one option or any combination of alternative options. For example, A or B means A or B or both and A, B, or C means A, B, or C, in any combination or permutation. If "or" is used to indicate an exclusive choice of alternatives or if there is any limitation on combinations of alternatives, the list of alternatives specifically indicates that choices are exclusive or that certain combinations are not included. For example, A or B, but not both is used to indicate use of an exclusive "or" condition. Similarly, A, B, or C, but no combinations and A, B, or C, but not the combination of A, B, and C are examples where certain combinations of alternatives are not included in the choices associated with the list.

"Processor," as used herein includes, but is not limited to, one or more of virtually any number of processor systems or stand-alone processors, such as microprocessors, microcontrollers, central processing units (CPUs), distributed processors, paired processors, and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software," as used herein includes, but is not limited to, one or more computer readable or executable instructions that cause a computer or another electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system, or other types of executable instructions. It will be appreciated by one of ordinary skill in the art that the form of software is dependent on, for example, requirements of a desired application, the environment it runs on, or the desires of a designer/programmer or the like.

"Software component," as used herein includes, but is not limited to, a collection of one or more computer readable or executable instructions that cause a computer or other electronic device to perform functions, actions or behave in a desired manner. The instructions may be embodied in various forms like routines, algorithms, modules, methods, threads, or programs. Software components may be implemented in a variety of executable or loadable forms including, but not limited to, a stand-alone program, a servelet, an applet, instructions stored in a memory, and the like. Software components can be embodied in a single computer component or can be distributed between computer components.

The following table includes long form definitions of exemplary acronyms, abbreviations, and labels for variables and constants in mathematical or logical expressions used within this disclosure. Except where noted otherwise, variants of all acronyms, including singular forms, plural forms, and other affixed forms, fall within each exemplary acronym meaning. Except where noted otherwise, capitalized and non-capitalized forms of all acronyms fall within each meaning.

| Acronym | Long Form |
| --- | --- |
| AC | Alternating current |
| ADC | Analog-to-digital conversion |
| ASIC | Application specific integrated circuit |
| CPU | Central processing unit |
| DAC | Digital-to-analog conversion |
| DC | Direct current |
| DSP | Digital signal processor |
| EPROM | Erasable programmable read-only memory |
| GB | Gearless brushless |
| I | Integrative |
| LAN | Local area network |
| P | Proportional |
| PI | Proportional-Integrative |
| PROM | Programmable read-only memory |
| RAM | Random access memory |
| ROM | Read-only memory |

The various embodiments of motorized wheelchairs disclosed herein may be implemented in various configurations incorporating various combinations of common and specific features that improve or enhance stability of the corresponding wheelchair. The term "gyro" or "gyro sensor" may be used herein as a synonym of the more general term "rate-of-turn sensor." The "gyro," as referred to herein, may include any sensor or combination of sensors that can be used to determine the actual turn rate of the corresponding motorized wheelchair. References to a gyroscope per se (i.e., a spinning gyroscope) may be made using the full term "gyroscope."

It is understood that a classical gyroscope comprises a flywheel capable of rotating about an axis passing through its center of gravity and generating a reaction on the bearings of the axis if there is a change of direction of the corresponding system with which the gyroscope is associated. This reaction on the bearings is due to the rotating flywheel resisting the change of direction. This may be referred to as the "Coriolis force." Thus, with the aid of a gyroscope, actual turn rates (i.e., turn speeds) of the system may be detected. Many modern gyro devices no longer include rotating parts, like the flywheel. For example, modern gyro devices, such as vibrating structure gyros, may incorporate micro-machined sensors or piezoelectric devices which make use of the Coriolis force. Other types of modern gyro devices include ring laser gyros and fiber optic gyros. The rate-of-turn sensors disclosed herein may be implemented using modern gyro devices.

The terms "preferable" and "preferably" may be used herein to indicate optional configurations or features and, in accordance with the ordinary meaning of the terms, does not indicate that any specific configuration or any specific feature is mandatory or the only possible configuration or arrangement of features that may be implemented. Front and rear, left and right, as well as bottom and top, as used herein are referenced from the perspective of a user seated in the corresponding motorized wheelchair.

FIG. 1 shows an exemplary motorized wheelchair 10 comprising a left drive wheel 12, a right drive wheel 14, a left motor 16, a right motor 18, a left castor wheel 20, a right castor wheel 22, a left idler wheel 24, a right idler wheel 26, an input device 28, and a chassis 30, on which a rate-of-turn sensor assembly 32 may be located. As shown, the input device 28 may include a joystick 34 as an operator input device to control, for example, driving the motorized wheelchair 10. The input device 28 may also include other input devices, such as a pushbuttons or other types of switches, potentiometers, or other types of control devices, and output devices, such as a graphic display, alphanumeric display, or indicators. Any suitable combination of input devices may be used to control driving the motorized wheelchair 10. In other embodiments, the other input devices of the input device 28 may be used to control driving instead of the joystick 34. For example, the input device 28 may include input devices for special needs users, such as a proportional head control, a sip n' puff system, a fiber optic tray array, a proximity head array, or a proximity switch array. The rate-of-turn sensor assembly 32 may include one or more rate-of-turn sensors to sense rotation in a horizontal plane, e.g., rotation with reference to a vertical axis. Each rate-of-turn sensor may include a gyroscope, a modern gyro device (e.g., a vibrating structure gyro, ring laser gyro, or fiber optic gyro), an angular rate sensor (e.g., a piezoelectric ceramic gyro, model no. CG-16D, by NEC TOKIN America, Inc. of Union City, Calif.), or a combination of accelerometers to sense and provide a signal associated with an actual turn rate for the motorized wheelchair 10.

The left and right motors 16, 18, for example, may include gearless brushless (GB) motors. In other embodiments, the motors, for example, may include 2-pole motors, 4-pole motors, or 4-pole motors with feedback (e.g., speed sensor). The type of motor may include a permanent magnet motor, a brushless motor, a shunt-wound field motor, a series-wound field motor, or a compound-wound field motor. Additionally, the type of motor may include a direct current (DC) motor, an alternating current (AC) motor, a 3-phase motor, a multi-phase motor, or a reversible motor. A specific type of motor may have characteristics associated with a combination of these various types of motors. For example, a particular DC motor may also be brushless, multi-phase, and reversible and may include permanent magnets. It is presumed that the left and right motors 16, 18 are the same type in any given exemplary embodiment. The left and right drive wheels 12, 14 are independently driven by the left and right motors 16, 18. Thus, steering the motorized wheelchair 10 may be accomplished through differential variable speed and direction (i.e., forward or reverse) control of the left and right motors 16, 18. As shown, the left and right motors 16, 18 may mechanically interface with the corresponding left and right drive wheel 12, 14 directly. In other embodiments, the mechanical interface may be via a gearbox assembly or another suitable type of drive train.

It can be remarked from FIG. 1 that the exemplary embodiment of the motorized wheelchair 10 shown is front-wheel driven, with large left and right drive wheels 12, 14 being arranged in front of swiveling left and right castor wheels 20, 22. In front-wheel driven wheelchairs, the space in front of a user seated in the wheelchair is less encumbered, providing more freedom to move legs and to approach objects from the front of the wheelchair. In the embodiment of the motorized wheelchair being described, the comfort and other advantages of a less encumbered front part of the wheelchair is combined with a high degree of stability of the vehicle. As can be seen from FIG. 1, the exemplary embodiment of the motorized wheelchair 10 may include a pair of anti-tip idler wheels 24, 26 to avoid tipping. Of course, the teachings of this disclosure may be used to improve wheelchairs of different configurations, such as mid-wheel driven wheelchairs, rear-wheel driven wheelchairs, as well as other front-wheel driven wheelchairs. Similarly, other embodiments of the motorized wheelchair 10 may include one or more castor wheels in any suitable arrangement and disposed in any suitable relation to the left and right drive wheels 12, 14. Likewise, other embodiments of the motorized wheelchair 10 may include one or more idler wheels in any suitable arrangement and disposed in any suitable relation to the left and right drive wheels 12, 14.

This disclosure presents multiple features for improving stability of a wheelchair. Although exemplary embodiments may be discussed herein with various combinations of features for improving stability of a motorized wheelchair, it is to be understood that many of these features may be used independently of each other. For example, it may be beneficial to add one or more of these features (adding only required structure and corresponding functionality and methods) to a known motorized wheelchair, such as to any of the wheelchairs taught in U.S. Pat. No. 6,202,773 or U.S. Pat. No. 6,615,937, which are hereby incorporated by reference. One or more of these features (e.g., veer compensation, dynamic sensor offset compensation, drift intervention, fail-safe operation, enhanced fail-safe operation) may be added to the embodiments of motorized wheelchairs disclosed in the '773 and '937 patents in accordance with the teachings of this disclosure.

FIG. 2A shows a block diagram of an exemplary embodiment of a motorized wheelchair 40 with a closed-loop control system to improve stability of the wheelchair. The motorized wheelchair 40 includes left and right drive wheels 42, 44 and corresponding left and right drive motors 46, 48. The left and right motors 46, 48 may include DC motors. In other embodiments, another type of motor may be implemented. The motorized wheelchair 40 also includes an input device 50, a rate-of-turn sensor assembly 52 with a first rate-of-turn sensor 54 and an optional second rate-of-turn sensor 56, and a controller 58.

The controller 58 receives signals from the input device 50 and the rate-of-turn sensor assembly 52. The signals from the input device 50 are related to desired linear speed and desired turn rate for the motorized wheelchair 40 based at least in part on manipulation of one or more input devices by an operator. The signals from the rate-of-turn sensor assembly 52 are related to an actual turn rate for the motorized wheelchair 40. The controller 58 may scale (e.g., normalize) the signals from the rate-of-turn sensor assembly 52, the signals from the input device 50, or both so that the actual turn rate and the desired turn rate are compatible. For example, the signals from the rate-of-turn sensor assembly 52 may be filtered and scaled based on the corresponding sensor component sensitivity (e.g., 5 mV per degree/second) and the associated analog/digital (A/D) converter resolution (e.g., 12 bits full scale at 5 vdc) which may provide a corresponding internal representation in counts per degree/second (e.g., 4.096 counts per degree/second). For this exemplary scaling, the rate-of-turn sensor assembly 52 may provide 17.6 counts per RPM if one sensor signal is used. Alternatively, the rate-of-turn sensor assembly 52 may provide 35.2 counts per RPM if both sensor signals are used and added together.

After the actual turn rate and desired turn rate are compatible, the controller 58 compares the actual turn rate to the desired turn rate to determine a turn rate error. The turn rate error may indicate the motorized wheelchair is veering. The controller 58 provides signals to the left and right motors 46, 48 to differentially control speed and direction (i.e., forward or reverse) of the motors. The controller 58 may adjust these signals to control the left and right motors 46, 48 so as to reduce the turn rate error. In another embodiment, the controller 58 may integrate the turn rate error to determine a bearing error (i.e., turn direction error) and may adjust the signals to control the left and right motors 46, 48 so as to reduce the bearing error. In still another embodiment, the controller 58 may adjust the signals to control the left and right motors 46, 48 so as to reduce both the bearing error and the turn rate error. The general feature provided by each of the implementations described with reference to FIG. 2A may be referred to as "veer compensation."

The first and second rate-of-turn sensors 54, 56 may be oriented with respect to each other and reference voltages may be applied to each in a manner that permits the dual actual turn rate signals to be used to correct for an offset voltage induced by one or more external parameters, such as temperature or supply voltage, during operation of the motorized wheelchair 40. For example, the orientation and interconnection may permit subtraction of the second actual turn rate signal from the first actual turn rate signal to result in an actual turn rate signal in which the offset voltage cancels out. This feature is optional and may be referred to as "dynamic sensor offset compensation."

The orientation and interconnection of the first and second rate-of-turn sensors 54, 56 may also permit the dual actual turn rate signals to be used to detect a failure of at least one of the first and second rate-of-turn sensors 54, 56. For example, the orientation and interconnection may permit the addition of the dual turn rate signals to normally result in a certain predetermined value. If the result is not within a predetermined threshold of the predetermined value, at least one of the rate-of-turn sensors 54 or 56 have failed. Additionally, one or both of the rate-of-turn sensors 54, 56 may be checked to be within a predetermined valid signal range. If at least one rate-of-turn sensor 54 or 56 fails, the controller 58 may stop using the rate-of-turn sensor assembly 52 to control normal operations of the motorized wheelchair 40. This feature is optional and may be referred to as a "fail-safe feature associated with veer compensation."

If at least one rate-of-turn sensor 54 or 56 fails, the controller 58 may continue to use closed-loop control schemes with other sensors to control the motorized wheelchair 40. Alternatively or additionally, the controller 58 may implement an algorithm that reduces linear speed and turn rate to predetermined levels in an orderly fashion and limits desired linear speed and turn rate to not exceed such levels. Typically, these predetermined levels are set to linear speeds and turn rates that provide suitable stability for continued operations. In another embodiment, if at least one rate-of-turn sensors 54 or 56 fails, the controller 58 may implement an algorithm that reduces linear speed and turn rate in an orderly fashion until the motorized wheelchair 40 comes to a stop. Other exemplary embodiments of the motorized wheelchair 40 may include a combination of electronic and mechanical stability features, such as anti-tip idler wheels 24, 26 (FIG. 1) to avoid tipping in combination with any one or more of the other stability features discussed herein.

The various features shown in FIG. 2A and discussed in the accompanying text (e.g., veer compensation, integrated veer compensation, dynamic sensor offset compensation, and any of the various fail-safe features associated with veer compensation) may be used alone or together to provide functionality to exemplary wheelchairs. Thus, systems may incorporate any one, or any two or more of these features, to provide enhanced functionality.

FIG. 2B shows a block diagram of another exemplary embodiment of a motorized wheelchair 60 with a closed-loop control system to improve stability of the wheelchair. The motorized wheelchair 60 includes left and right drive wheels 62, 64 and corresponding left and right motors 66, 68. The motorized wheelchair 60 may also include left and right speed sensors 70, 72 associated with either the corresponding left and right motors 66, 68 or the corresponding left and right drive wheels 62, 64. In this embodiment, the motors may include DC motors with feedback and each speed sensor may include, for example, a tachometer, tachogenerator, resolver, or any type of sensor suitable for measuring a linear speed, an angular speed, or a time between revolutions of the motors or drive wheels. In another embodiment, the left and right speed sensors 70, 72 may be disposed within the corresponding left and right motors 66, 68 to sense voltage or current associated with the motor leads. In this other embodiment, the left and right motors 66, 68 may include GB motors. In still other embodiments, any other type of motor and compatible sensor combination may be implemented to sense the speed of either the corresponding motor or the corresponding drive wheel. The motorized wheelchair 60 also includes an input device 74, a rate-of-turn sensor assembly 76 with a rate-of-turn sensor 78, and a controller 80.

The controller 80 receives signals from the input device 74 related to desired linear speed and desired turn rate for the motorized wheelchair 60 based at least in part on manipulation of one or more input devices by an operator. The controller 80 also receives signals from the left and right speed sensors 70, 72 and the rate-of-turn sensor assembly 76. The signals from the left and right speed sensors 70, 72 are related to expected linear speed for the motorized wheelchair 60 based at least in part on actual rotation of the corresponding left and right drive wheels 62, 64. The controller 80 may subtract, for example, the expected left linear (or angular) speed from the expected right linear (or angular) speed to determine a result related to an expected turn rate for the motorized wheelchair 60. The signal from the rate-of-turn sensor assembly 76 is related to an actual turn rate for the motorized wheelchair 60. The controller 80 may scale the signal from the rate-of-turn sensor assembly 76, the signals from the left and right speed sensors 70, 72, or both so that the actual turn rate and the expected turn rate are compatible. This scaling, for example, may account for distance between the left and right drive wheels 62, 64 because the true expected turn rate would vary from the result of the above subtraction by factors relating to these parameters. For example, a first motorized wheelchair with a first distance between drive wheels may be scaled differently than a second motorized wheelchair with a different distance between drive wheels. For example, the signals from the left and right speed sensors 70, 72 may be filtered and scaled to maintain an appropriate resolution. In one embodiment, for example, one revolution per minute (RPM) may correspond to approximately 28 counts. For example, the signals from the rate-of-turn sensor assembly 76 may be filtered and scaled based on the corresponding sensor component sensitivity (e.g., 5 mV per degree/second) and the associated analog/digital (A/D) converter resolution (e.g., 12 bits full scale at 5 vdc) which may provide a corresponding internal representation in counts per degree/second (e.g., 4.096 counts per degree/second). Additionally, the distance between wheels and the diameters of the wheels may be accounted for which then allows the RPM to be converted to the vehicle's turn rate in degrees/second. For example, two 14 inch wheels turning in opposite directions at the same RPM speed and mounted in a distance of 50 cm may lead to a ratio of approximately 4.3 degrees/second per RPM. For this exemplary scaling, the left and right speed sensors 70, 72 may provide 28 counts per RPM, the rate-of-turn sensor assembly 76 may provide 17.6 counts per RPM if one sensor signal is used or 35.2 counts per RPM if both sensor signals are used. Lastly, the signal from the left and right speed sensors 70, 72 may be multiplied by a factor of 28/35.2 (i.e., approximately 0.795) in order to be properly compared to the signal from the rate-of-turn sensor assembly 76.

After the actual turn rate and expected turn rate are compatible, the controller 80 may compare the actual turn rate to the expected turn rate to the determine a result related to a turn rate error. If the turn rate error is greater than a predetermined threshold, the motorized wheelchair 60 may be drifting due to loss of traction (e.g., spinning out or skidding). For purposes of this application, "drifting" refers to the wheelchair being off course from an expected course, where the expected course is based at least in part on the actual rotation of the drive wheels. The predetermined threshold for the turn rate error is typically set to a value that would distinguish being off course a larger amount from being off course a smaller amount. For purposes of this application, being off course a smaller amount may be associated with veering due to, for example, traveling across a slope or in a cross wind, and being off course a larger amount may be associated with drifting due to, for example, loss of traction (e.g., spinning out or skidding). The general feature provided by each of the implementations described with reference to FIG. 2B may be referred to as "drift intervention."

During normal operation, the controller 80 may adjust signals to the left and right motors 16, 18 to differentially control speed and direction (i.e., forward or reverse) of the left and right motors 66, 68 in response to operator manipulation of input devices associated with the input device 74. However, after the turn rate error exceeds the predetermined threshold, the controller 80 may adjust the signals to the left and right motors 66, 68 to reduce the linear speed and turn rate of the motorized wheelchair 60 to predetermined levels at which recovery of traction might be expected. Typically, the reduction in linear speed and turn rate of the motorized wheelchair 60 is performed in an orderly fashion to accomplish a controlled deceleration that avoids tipping or uncontrolled spin-outs. In another embodiment, after the turn rate error exceeds the predetermined threshold, the controller 80 may adjust the signals to the left and right motors 66, 68 to reduce the linear speed and turn rate of the motorized wheelchair 60 until it comes to a stop. Again, typically, this reduction in linear speed and turn rate of the motorized wheelchair 60 is performed in an orderly fashion to accomplish a controlled deceleration that avoids tipping or uncontrolled spin-outs. Other exemplary embodiments of the motorized wheelchair 60 may include a combination of electronic and mechanical stability features, such as anti-tip idler wheels 24, 26 (FIG. 1) to avoid tipping in combination with any one or more of the other stability features discussed herein.

The various features shown in FIG. 2B and discussed in the accompanying text (e.g., drift intervention and any of the various fail-safe features associated with drift intervention) may be used alone or together to provide functionality to exemplary wheelchairs. Thus, systems may incorporate any one, or any two or more of these features, to provide enhanced functionality.

FIG. 2C shows a block diagram of still another exemplary embodiment of a motorized wheelchair 90 with a closed-loop control system to improve stability of the wheelchair. Generally, the embodiment being described combines the veer compensation features of FIG. 2A and drift intervention features of FIG. 2B described above. The motorized wheelchair 90 includes left and right drive wheels 92, 94 and corresponding left and right motors 96, 98. The motorized wheelchair 90 may also include left and right speed sensors 100, 102 associated with either the corresponding left and right motors 96, 98 or the corresponding left and right drive wheels 92, 94. The motors may include DC motors with feedback and each speed sensor may include, for example, a tachometer, tachogenerator, resolver, or any type of sensor suitable for measuring a linear speed, an angular speed, or a time between revolutions of the motors or drive wheels. In another embodiment, the left and right speed sensors 100, 102 may be disposed within the corresponding left and right motors 96, 98 to sense voltage or current associated with the motor leads. In this other embodiment, the left and right motors 96, 98 may include GB motors. In still other embodiments, any type of motor and compatible sensor combination may be implemented to sense the speed of either the corresponding motor or the corresponding drive wheel. The motorized wheelchair 90 also includes an input device 104, a rate-of-turn sensor assembly 106 with first and second rate-of-turn sensors 108, 110, and a controller 112.

The controller 112 receives signals from the input device 104 and the rate-of-turn sensor assembly 106. The signals from the input device 104 are related to desired linear speed and desired turn rate for the motorized wheelchair 90 based at least in part on manipulation of one or more input devices by an operator. The signals from the rate-of-turn sensor assembly 106 are related to an actual turn rate for the motorized wheelchair 90. The controller 112 may scale the signals from the rate-of-turn sensor assembly 106, the signals from the input device 104, or both so that the actual turn rate and the desired turn rate are compatible. This scaling may be accomplished in the same manner as described above with reference to FIG. 2A.

With reference again to FIG. 2C, after the actual turn rate and desired turn rate are compatible, the controller 112 compares the actual turn rate to the desired turn rate to determine a first turn rate error. The first turn rate error may indicate the motorized wheelchair is veering. The controller 112 provides signals to the left and right motors 96, 98 to differentially control speed and direction (i.e., forward or reverse) of the motors. During normal operation, the controller 112 may adjust these signals to control the left and right motors 96, 98 so as to reduce the first turn rate error. In another embodiment, the controller 112 may integrate the first turn rate error to determine a bearing error (i.e., turn direction error) and may adjust the signals to control the left and right motors 96, 98 so as to reduce the bearing error. In still another embodiment, the controller 112 may adjust the signals to control the left and right motors 96, 98 so as to reduce both the bearing error and the first turn rate error.

The first and second rate-of-turn sensors 108, 110 of FIG. 2C may be oriented with respect to each other and reference voltages may be applied to each in a manner that the permits the optional dynamic sensor offset compensation feature described above with reference to FIG. 2A to be optionally implemented in the motorized wheelchair 90. Likewise, the fail-safe feature associated with veer compensation described above with reference to FIG. 2A may be optionally implemented in the motorized wheelchair 90.

The controller 112 receives signals from the left and right speed sensors 100, 102 related to expected linear speed for the motorized wheelchair 90 based at least in part on actual rotation of the corresponding left and right drive wheels 92, 94. The controller 112 may subtract, for example, the expected left linear (or angular) speed from the expected right linear (or angular) speed to determine a result related to an expected turn rate for the motorized wheelchair 90. The signals from the rate-of-turn sensor assembly 106 are related to the actual turn rate. The controller 112 may scale the signals from the rate-of-turn sensor assembly 106, the signals from the left and right speed sensors 100, 102, or both so that the actual turn rate and the expected turn rate are compatible. This scaling may be accomplished in the same manner as describe above with reference to FIG. 2B. After the actual turn rate and expected turn rate are compatible, the controller 112 may compare the actual turn rate to the expected turn rate to determine a second turn rate error. If the second turn rate error is greater than a predetermined threshold, the motorized wheelchair 90 may be drifting due to loss of traction. This comparing establishes whether the motorized wheelchair 90 is off course by a larger amount in the same manner as described above with reference to FIG. 2B.

The thresholds for the first and second turn rate errors may be selected to provide correction for veer first and then drift as the error increases. During normal operation, the controller 112 adjusts signals to the left and right motors 96, 98 to differentially control speed and direction (i.e., forward or reverse) of the left and right motors 96, 98 in response to operator manipulation of input devices associated with the input device 104. Initially, after loss of traction, the veer compensation feature may detect that the actual turn rate is different than the desired turn rate and the first turn rate error may cause the control signals to the motors to be adjusted to attempt to compensate for veer. This may cause the drive wheel(s) associated with the loss of traction to rotate faster. However, this may simply exacerbate the loss of traction and also increase the first turn rate error due to the loss of traction. If so, this pronounces the loss of traction condition and accelerates an increase in the second turn rate error toward the predetermined threshold associated with detection of drift. After the second turn rate error exceeds the predetermined threshold, the drift intervention feature operates to disable normal operations, including the veer compensation feature, and transitions operations to recover control of the motorized wheelchair 90. More specifically, the drift intervention feature causes the controller 112 to adjust the signals to the left and right motors 96, 98 to perform a controlled deceleration and limit desired linear speed and turn rate in the same manner as described above with reference to FIG. 2B.

In the embodiment being described, the fail-safe feature may be augmented to check each rate-of-turn sensor 108, 110 in a manner that can isolate failures to the first rate-of-turn sensor 108, the second rate-of-turn sensor 110, and both rate-of-turn sensors 108, 110. If one rate-of-turn sensor 108 or 110 has failed, the remaining operational rate-of-turn sensor 110 or 108 may be used to provide the actual turn rate signal used by the drift intervention feature described above. However, if both rate-of-turn sensors 108, 110 have failed, the drift intervention feature may be activated to disable normal operations in the same manner described above for circumstances where the second turn rate error exceeds the predetermined threshold. This feature is optional and may be referred to as an "enhanced fail-safe feature associated with drift intervention." In another embodiment, when both rate-of-turn sensors 108, 110 have failed, the drift intervention feature may be disabled and other mechanisms may be used to control the motorized wheelchair 90. Other exemplary embodiments of the motorized wheelchair 90 may include a combination of electronic and mechanical stability features, such as anti-tip idler wheels 24, 26 (FIG. 1) to avoid tipping in combination with any one or more of the other stability features discussed herein.

The various features shown in FIG. 2C and discussed in the accompanying text (e.g., veer compensation, integrated veer compensation, dynamic sensor offset compensation, drift intervention, and any of the various fail-safe features associated with veer compensation or drift intervention) may be used alone or together to provide functionality to exemplary wheelchairs. Thus, systems may incorporate any one, or any two or more of these features, to provide enhanced functionality.

FIGS. 3A-C are more detailed block diagrams illustrating various exemplary features to improve the stability of various embodiments of motorized wheelchairs. It is clear to the skilled person that the various stability features shown in FIGS. 3A-C may be implemented individually or in various combinations in addition to those shown in the drawings. FIGS. 3A-C show the origin of certain signals and certain ways in which those signals are processed. It is understood that some additional circuitry or logic (e.g., processor, CPU, computer, computer components or peripherals, etc.) commonly associated with certain aspects of the functions or certain aspects of the signal processing (e.g., digital-to-analog conversion (DAC), analog-to-digital conversion (ADC), etc.) may not be shown in FIGS. 3A-C.

With reference to FIGS. 3A-C, various individual functional elements and various combinations of functional elements of the stability features of the various embodiments of motorized wheelchairs are shown. In FIGS. 3A-C, arrows may indicate the direction of signals, rectangles may indicate the generation or processing of signals and circles may indicate units summing or subtracting signals, unless otherwise indicated. It is clear to the skilled person that referral to a box as a unit or logic, such as a rate-of-turn sensor unit or a sensor fault check logic 361 does not necessarily mean that the corresponding function is accomplished by an individual structural element. Additionally, it is understood that any individual structural element may contribute to multiple functions. It is also clear to the skilled person that the corresponding function may be accomplished by any suitable combination of hardware, software, or firmware elements.

With reference to FIG. 3A, an embodiment of a motorized wheelchair 300 may include left and right drive wheels 311, 312, left and right motors 313, 314, left and right motor controllers 315, 316, left and right control loop devices 317, 318, input device 331, turn rate command signal 332, turn rate circuit 333, linear speed command signal 334, linear speed circuit 335, first summing node 341, second summing node 342, subtracting node 343, veer feedback switch 351, subtracting node 352, veer scale logic 353, P-gain logic 354, I-gain logic 355, integrator logic 356, summing node 357, sensor fault check logic 361, first rate-of-turn sensor 362, second rate-of-turn sensor 363, first subtracting node 364, and summing node 365. In particular, the veer feedback switch 351, P-gain logic 354, sensor fault check logic 361, second rate-of-turn sensor 363, first subtracting node 364, and summing node 365 are optional.

The left and right drive wheels 311, 312, left and right motors 313, 314, left and right motor controllers 315, 316, and left and right control loop devices 317, 318 may be referred to as a "motor unit." The first summing node 341, second summing node 342, and subtracting node 343 may be referred to as a "node unit." The proportional (P)-gain logic 354, integrative (I)-gain logic 355, integrator logic 356, and summing node 357 may be referred to as an "error amplifier unit." The veer feedback switch 351, subtracting node 352, veer scale logic 353, and error amplifier unit may be referred to as a "veer correction unit." The sensor fault check logic 361, first rate-of-turn sensor 362, second rate-of-turn sensor 363, first subtracting node 364, and summing node 365 may be referred to as a "rate-of-turn sensor unit."

The motorized wheelchair 300 may also include a power source, such as a battery, that is not shown in FIG. 3A. Left and right motor controllers 315, 316 condition DC voltage from the battery to form power signals compatible with the left and right motors 313, 314. The left and right motor controllers 315, 316 further condition and adjust the power signals based at least in part on output signals from corresponding left and right control loop devices 317, 318 to control speed and direction of the left and right motors 313, 314. As shown, the left and right motors 313, 314 may include DC motors. In other embodiments, the motors may include DC motors with feedback or GB motors. In additional embodiments, other types of motor may be implemented.

The motor controllers may include any type of motor controller able to suitably control speed and direction (i.e., forward or reverse) of the corresponding motors for suitable operation of the corresponding motorized wheelchair. For example, in the embodiment being described and other embodiments with DC motors, the left and right motor controllers 315, 316 may condition the DC voltage from the battery and individually control the amplitude of power signals to the left and right motors 313, 314. In embodiments with AC motors, the motor controllers may convert the DC voltage from the battery to a suitable AC voltage with respect to amplitude and phase and may individually control the frequency and/or duty cycle of each power signal to the AC motors. Motor controllers may be implemented using various known technologies, including pulse-width modulation (PWM).

Control of said left and right control loop devices 317, 318 may be based at least in part on a driver or an occupant of the motorized wheelchair 300 operating an input device associated with the input device 331. The input device 331 may deliver the turn rate command signal 332 to the turn rate circuit 333 and the linear speed command signal 334 to the linear speed circuit 335. In conjunction with the turn rate command signal 332, the amplitude or polarity of the signal may provide left or right turn direction information. In conjunction with the linear speed command signal 334, the amplitude or polarity of the signal may provide forward or reverse direction information. Each of said turn rate and linear speed circuits 333, 335 may be operatively connected to said left and right control loop devices 317, 318 via the node unit. The input device 331 may include, for example, a joystick or other types of input devices to indicate operator-desired linear speed and turn rates for the motorized wheelchair 300. For example, the input device 331 may include input devices for special needs users, such as a proportional head control, a sip n' puff system, a fiber optic tray array, a proximity head array, or a proximity switch array. The turn rate and linear speed circuits 333, 335 may be interconnected and the corresponding output signals of both circuits may be based at least in part on both the turn rate and linear speed command signals 332, 334.

The first summing node 341 may include a first input connected to said output of the turn rate circuit 333 and a second input connected to an output of the veer feedback switch 351. The output of the first summing node 341 may be connected to a subtracting input of the subtracting node 343 and a first input of the second summing node 342. Second inputs of said subtracting node 343 and said second summing node 342 may be connected to the output of said linear speed circuit 335.

During normal operation, the veer feedback switch 351 may be closed and may provide a turn rate error signal indicative of veer to the first summing node 341. The veer feedback switch 351 may open in response to a fault signal generated by the sensor fault check logic 361. The fault signal may be generated if a fault is detected in one or more of the first and second rate-of-turn sensors 362, 363. The fault signal may be latched by the sensor fault check logic 361 to prevent use of signals from the first and second rate-of-turn sensors 362, 363 if at least one has failed. A latched fault signal may be reset after the motorized wheelchair 300 is brought to a stop, for example, either automatically or via a power reset sequence, soft reset sequence, or activation of a reset control.

The subtracting node 352 may include a subtracting input connected to an output of the veer scale logic 353, a second input connected to the output of the turn rate circuit 333, and an output connected to the error amplifier unit. An output of the summing node 357 of the error amplifier unit may deliver a signal to a first input of the veer feedback switch 351. The error amplifier unit may provide a P, I or proportional-integrative (PI) feedback control circuit for desired turn rates based on actual turn rates. The first and second rate-of-turn sensors 362, 363 sense actual turn rates for the motorized wheelchair 300, e.g., the actual turn rate of the seat or chassis. It should be noted that the integrative (I) part of the error amplifier unit, as represented by the I-gain logic 355 and integrator logic 356, integrates the turn rate error which provides a turn direction or bearing error.

An output of the first rate-of-turn sensor 362 may be connected to summing inputs of said first subtracting node 364 and said summing node 365. An output of the second rate-of-turn sensor 363 may be connected to a subtracting input of said first subtracting node 364 and a second summing input of said summing node 365. The output of the summing node 365 may be provided to said sensor fault check logic 361. The veer scale logic 353 of the veer correction unit may receive an output signal from said first subtracting node 364 of said rate-of-turn sensor unit.

The left and right control loop devices 317, 318 may perform a fast standard routine to maintain rotational speeds of the left and right drive wheels 311, 312 as provided by second summing node 342 and subtracting node 343 within certain predetermined limits. Certain differences in the rotational speed of the left and right drive wheels 311, 312 cause the motorized wheelchair 300 to turn at certain corresponding turn rates. Conversely, when the left and right drive wheels 311, 312 rotate in the same direction (i.e., forward or reverse) at the same speed, the motorized wheelchair 300 normally travels straight forward or straight backward, depending on the direction of rotation.

The turn rate and linear speed circuits 333, 335 may interact in a way that certain threshold values for certain parameters, such as SpeedProduct=(turn rate)×(linear speed), may automatically adjust a maximum linear speed limit as the desired turn rate changes or automatically adjust a maximum turn rate limit as the desired linear speed changes. For example, at certain desired linear speeds, a limit A may be applied to the desired turn rate by the turn rate circuit 333. The limit A may be defined by LimitA=SpeedProductA/desired linear speed. Additionally, at certain desired turn rates, a limit B may be applied to the desired linear speed by the linear speed circuit 335. For example, limit B may be defined by LimitB=SpeedProductB/desired turn rate. Notably, these routines do not necessarily require input from the rate-of-turn sensor unit.

In summary, one aspect of controlling the motorized wheelchair 300 includes a routine to prevent or reduce veering using the first and second rate-of-turn sensors 362, 363. This routine may be used for general stability, for example, when the actual turn rate for the motorized wheelchair 300 differs from the desired turn rate, even if this difference is relatively small. This routine compares desired turn rate data based at least in part on operator manipulation of an input device, e.g. a joystick, associated with the input device 331 with actual turn rate data from the rate-of-turn sensor unit to determine a turn rate error. This routine may use a proportional (P) closed-loop control method to bring the motorized wheelchair 300 back to the desired course as indicated by the input device being used by the operator based on the turn rate error. Additionally, this routine may use an integration method to determine a bearing (i.e., turn direction) error from the turn rate error to bring the motorized wheelchair 300 back to the desired course via an integrative closed-loop control process.

Operation of rate-of-turn sensors, particularly gyro devices, such as piezoelectric ceramic gyros, may be influenced by external parameters, such as temperature or supply voltage, in a manner that causes a voltage offset. In order to compensate for this voltage offset, previous motorized wheelchairs use a method of periodically testing the value of actual turn rate signals associated with the rate-of-turn sensors when the motorized wheelchair is at rest and relating this value to a reference for a zero turn rate. In contrast, the first and second rate-of-turn sensors 362, 363 in the motorized wheelchair 300 may be oriented and connected to reference voltages so that the output signal from one of the rate-of-turn sensors corresponds to an actual turn rate value v plus an error value e and the output signal of the other rate-of-turn sensor corresponds to an actual turn rate value −v plus the error value e. In this example, v represents a positive turn rate referenced from a normal zero turn rate value and −v represents a mirror image negative turn rate referenced from the normal zero turn rate value. Subtracting both signals via first subtracting node 364 yields 2 v and eliminates the error signal. To accomplish this, for example, one rate-of-turn sensor may be mounted upside down (e.g., flipped 180 degrees) in relation to the other rate-of-turn sensor in order to provide mirrored signals in this manner. This cancels out undesired voltage offsets, such as offsets influenced by temperature, supply voltage, or other external parameters. This straightforward dynamic sensor offset compensation feature presumes the characteristics of the two rate-of-turn sensors are generally the same and facilitates use of low cost rate-of-turn sensors. Other methods may be used if these characteristics are not generally the same.

Exemplary functions of the motorized wheelchair 300 shown in FIG. 3A and discussed in the accompanying text (e.g., veer compensation, integrated veer compensation, dynamic sensor offset compensation, and any of the various fail-safe features associated with veer compensation) may be used alone or together to provide functionality to exemplary wheelchairs. Thus, systems may incorporate any one, or any two or more of these features, to provide enhanced functionality. In one embodiment, control of the motors via negative turn rate error feedback for veer compensation may be provided, the turn rate error being the difference between the actual turn rate associated with the rate-of-turn sensors and the desired turn rate associated with the input device. This negative turn rate error feedback can include a proportional (P) component. In another embodiment, the turn rate error can be integrated and the negative turn rate error feedback can also include an integrative (I) component. This provides PI-type feedback control. In still another embodiment, the negative turn rate error feedback can include the integrative (I) component without the proportional (P) component. In yet another embodiment, the rate-of-turn sensor unit can provide dynamic sensor offset compensation for offsets in the actual turn rate signals associated with the rate-of-turn sensors that are due to certain external parameters, such as temperature and supply voltage, during operation of the motorized wheelchair as discussed herein. In still yet another embodiment, the rate-of-turn sensor unit can provide a fail-safe feature that disables the negative turn rate error feedback if one of the rate-of-turn sensors fails as discussed herein.

With reference to FIG. 3B, another embodiment of a motorized wheelchair 300' may include left and right drive wheels 311, 312, left and right motor controllers 315, 316, input device 331, turn rate command signal 332, linear speed command signal 334, second summing node 342, subtracting node 343, and first rate-of-turn sensor 362. These elements function in essentially the same manner as described above with reference to FIG. 3A. The motorized wheelchair 300' may also include left and right motors 313', 314', left and right control loop devices 317', 318', turn rate circuit 333', and linear speed circuit 335'. These elements function in a similar manner to corresponding reference numbers without the prime (') symbol described above with reference to FIG. 3A. Additionally, the motorized wheelchair 300' may include left and right speed sensors 321, 322, drift detection logic 323, turn rate/linear speed limiter logic 324, integrator logic 325, drift error node 326, drift error signal 327, drift scale logic 328, offset compensation signal 329, drift intervention signal 330, and second subtracting node 366.

The left and right drive wheels 311, 312, left and right motors 313', 314', left and right motor controllers 315, 316, and left and right control loop devices 317', 318' may be referred to as a "motor unit." The second summing node 342 and subtracting node 343 may be referred to as a "node unit." The first rate-of-turn sensor 362 and second subtracting node 366 may be referred to as a "rate-of-turn sensor unit." The left and right speed sensors 321, 322 may be referred to as a "speed sensor unit." The drift detection logic 323, turn rate/linear speed limiter logic 324, integrator logic 325, drift error node 326, and drift scale logic 328 may be referred to as a "drift correction unit."

As shown, the left and right motors 313', 314' may include DC motors with feedback provided by corresponding left and right speed sensors 321, 322 to the corresponding left and right control loop devices 317', 318'. The left and right speed sensors 321, 322 each may include, for example, a tachometer, tachogenerator, resolver, or any type of sensor suitable for measuring a linear speed, an angular speed, or a time between revolutions of the corresponding left and right motors 313', 314' or the corresponding left and right drive wheels 311, 312. In another embodiment, the speed sensors may be disposed within the corresponding left and right motors to sense voltage or current associated with the motor leads. For example, the motors may include GB motors and the motor leads may be used to sense a voltage related to motor speed. In still other embodiments, other types of motors or other types of sensors may be implemented.

Control of said left and right control loop devices 317', 318' may be based at least in part on a driver or an occupant of the motorized wheelchair 300' operating an input device 331. The input device 331 may deliver the turn rate command signal 332 to the turn rate circuit 333' as well as the linear speed command signal 334 to the linear speed circuit 335'. Each of said turn rate and linear speed circuits 333', 335' may be operatively connected to said left and right control loop devices 317', 318' via the node unit. The turn rate and linear speed circuits 333', 335' may be interconnected and the corresponding output signals of both circuits may be based at least in part on both the turn rate and linear command signals 332, 334.

The output of the turn rate circuit 333' may be connected to a subtracting input of the subtracting node 343 and a first input of the summing node 342. Second inputs of said subtracting node 343 and said second summing node 342 may be connected to the output of said linear speed circuit 335'.

The drift error node 326 generates an error signal for the drift detection logic 323 based on the output from the speed sensor 321, 322. The drift error node 326 may include a first inverting input connected to said drift scale logic 328, a second inverting input connected to the left speed sensor 321, a non-inverting input connected to the right speed sensor 322, and an output providing the drift error signal 327 to said drift detection logic 323. Said drift detection logic 323 may provide the offset compensation signal 329 to the integrator logic 325 if the drift error signal 327 does not exceed a predetermined threshold. Conversely, if the predetermined threshold is exceeded, the drift detection logic 323 may provide the drift intervention signal 330 to the turn rate/linear speed limiter logic 324. After receipt of the drift intervention signal 330, the turn rate/linear speed limiter logic 324 may provide a first control signal to the turn rate circuit 333' and a second control signal to the linear speed circuit 335' which the turn rate circuit 333' and linear speed circuit 335' may use to adjust the maximum turn rate and maximum linear speed.

An output of the first rate-of-turn sensor 362 may be connected to a summing input of said second subtracting node 366. The second subtracting node 366 may also include a subtracting input connected to an output signal from the integrator logic 325 of said drift correction unit. The drift scale logic 328 of the drift correction unit may receive an output signal from said second subtracting node 366 of said rate-of-turn sensor unit.

The left and right control loop devices 317', 318' may perform a fast standard routine to maintain rotational speeds of the left and right drive wheels 311, 312 as provided by second summing node 342 and subtracting node 343 within certain predetermined limits. The left and right speed sensors 321, 322, for example, may provide feedback to the corresponding left and right control loop devices 317', 318' for use in maintaining the rotational speeds. Certain differences in the rotational speeds of the left and right drive wheels 311, 312 cause the motorized wheelchair 300' to turn at certain corresponding turn rates. Conversely, when the left and right drive wheels 311, 312 rotate in the same direction (i.e., forward or reverse) at the same speed, the motorized wheelchair 300' normally travels straight forward or straight backward, depending on the direction of rotation.

The turn rate and linear speed circuits 333', 335' may interact in a way that certain threshold values for certain parameters, such as SpeedProduct=(turn rate)×(linear speed) may automatically adjust a maximum linear speed limit as the desired turn rate changes or automatically adjust a maximum turn rate limit as the desired linear speed changes. For example, at certain desired linear speeds, a limit A may be applied to the desired turn rate by the turn rate circuit 333'. The limit A may be defined by LimitA=SpeedProductA/desired linear speed. Additionally, at certain desired turn rates, a limit B may be applied to the desired linear speed by the linear speed circuit 335'. For example, limit B may be defined by LimitB=SpeedProductB/desired turn rate. Notably, these routines do not necessarily require input from the rate-of-turn sensor unit, unless the drift error signal 327 exceeds the predetermined threshold in the drift detection logic 323. If so, the drift detection logic 323 uses the drift intervention signal 330 to activate the turn rate/linear speed limiter logic 324. After activation, the turn rate/linear speed limiter logic 324 uses the first and second control signals to initiate drift intervention operations within turn rate and linear speed circuits 333', 335'. The drift intervention operations may cause the turn rate and linear speed circuits 333', 335' to reduce maximum turn rate and linear speed values in an orderly fashion so that control of the motorized wheelchair 300' may be recovered to prevent it from skidding, spinning out of control, or tipping. If the drift error signal 327 does not exceed the predetermined threshold, the turn rate/linear speed limiter logic 324 may permit normal operation of the turn rate and linear speed circuits 333', 335'.

In summary, one aspect of controlling the motorized wheelchair 300' includes a routine to detect and react to drift involving the first rate-of-turn sensor 362. This routine, for example, may detect a loss of traction condition causing the motorized wheelchair 300' to drift off course. In response to detecting drift, the routine may disable normal operations and initiate measures to prevent or reduce loss of control. Drift is detected by comparing data from the left and right speed sensors 321, 322 related to an expected turn rate with data from the rate-of-turn sensor 362 related to actual turn rate. A deviation between the data indicates there has been loss of traction. If the deviation exceeds a predetermined threshold, the desired turn rate, desired linear speed, and corresponding signals controlling the motors may be adjusted to reduce the turn rate and speed of the motorized wheelchair 300' in order to recover from the loss of traction. For example, when necessary, this routine may disable normal operations by reducing the maximum values for desired turn rate and desired linear speed in an orderly fashion to avoid having the motorized wheelchair 300' skid, spin out of control, or tip over.

The various features shown in FIG. 3B and discussed in the accompanying text (e.g., drift intervention and any of the various fail-safe features associated with drift intervention) may be used alone or together to provide functionality to exemplary wheelchairs. Thus, systems may incorporate any one, or any two or more of these features, to provide enhanced functionality. In one embodiment, if the actual turn rate associated with the first rate-of-turn sensor 362 differs more than a predetermined amount from an expected turn rate associated with the left and right speed sensors 321, 322, decelerate the motorized wheelchair 300' and reduce the turn rate to prevent it from skidding, spinning out of control, or tipping.

With reference to FIG. 3C, another embodiment of a motorized wheelchair 300" may include left and right drive wheels 311, 312, left and right motor controllers 315, 316, input device 331, turn rate command signal 332, linear speed command signal 334, first summing node 341, second summing node 342, subtracting node 343, veer feedback switch 351, subtracting node 352, veer scale logic 353, P-gain logic 354, I-gain logic 355, integrator logic 356, summing node 357, sensor fault check logic 361, first rate-of-turn sensor 362, second rate-of-turn sensor 363, first subtracting node 364, and summing node 365. These elements function in essentially the same manner as described above with reference to FIGS. 3A and 3B. The motorized wheelchair 300" may also include left and right motors 313', 314', left and right control loop devices 317', 318', left and right speed sensors 321, 322, drift detection logic 323, turn rate/linear speed limiter logic 324, integrator logic 325, drift error node 326, drift error signal 327, offset compensation signal 329, drift intervention signal 330, linear speed circuit 335', and second subtracting node 366. These elements function in the same as described above with reference to FIG. 3B.

Additionally, the motorized wheelchair 300" may include drift scale logic 328' and turn rate circuit 333". Drift scale logic 328' functions in a similar manner to drift scale logic 328 of FIG. 3B. The drift scale logic 328' may apply different scaling than drift scale logic 328 due to the dual rate-of-turn sensor arrangement in the motorized wheelchair 300". Turn rate circuit 333" functions in a similar manner to a combination of turn rate circuit 333 of FIG. 3A and turn rate circuit 333' of FIG. 3B. Input signals to turn rate circuit 333" are provided in the same manner as described for turn rate circuit 333' of FIG. 3B. Output signals from turn rate circuit 333" are distributed in the same manner as described for turn rate circuit 333 of FIG. 3A.

The left and right drive wheels 311, 312, left and right motors 313', 314', left and right motor controllers 315, 316, and left and right control loop devices 317', 318' may be referred to as a "motor unit." The left and right speed sensors 321, 322 may be referred to as a "speed sensor unit." The drift detection logic 323, turn rate/linear speed limiter logic 324, integrator logic 325, drift error node 326, and drift scale logic 328' may be referred to as a "drift correction unit." The first summing node 341, second summing node 342, and subtracting node 343 may be referred to as a "node unit." The P-gain logic 354, I-gain logic 355, integrator logic 356, and summing node 357 may be referred to as an "error amplifier unit."

The veer feedback switch 351, subtracting node 352, veer scale logic 353, and error amplifier unit may be referred to as a "veer correction unit." The sensor fault check logic 361, first rate-of-turn sensor 362, second rate-of-turn sensor 363, first subtracting node 364, summing node 365, and second subtracting node 366 may be referred to as a "rate-of-turn sensor unit."

The motorized wheelchair 300" may also include a power source, such as a battery, not shown in FIG. 3C. As shown, the left and right motors 313', 314' may include DC motors with feedback provided by corresponding left and right speed sensors 321, 322 to the corresponding left and right control loop devices 317', 318'. The left and right speed sensors 321, 322 each may include, for example, a tachometer, tachogenerator, resolver, or any type of sensor suitable for measuring a linear speed, an angular speed, or a time between revolutions of the corresponding left and right motors 313', 314' or the corresponding left and right drive wheels 311, 312. In another embodiment, speed sensors may be disposed within the corresponding left and right motors to sense voltage or current associated with the motor leads. For example, the motors may include GB motors and the motor leads may be used to sense voltage related to motor speed.

Control of said control loop devices 317', 318' may be based at least in part on a driver or an occupant of the motorized wheelchair 300" operating an input device associated with the input device 331. The input device 331 may deliver the turn rate command signal 332 to the turn rate circuit 333" as well as the linear speed command signal 334 to the linear speed circuit 335'. Each of said turn rate and linear speed circuits 333", 335' may be operatively connected to said two left and right control loop devices 317', 318' via the node unit. The input device 331 may include, for example, a joystick or other types of input devices to indicate operator-desired linear speed and turn rates for the motorized wheelchair 300". For example, the input device 331 may include input devices for special needs users, such as a proportional head control, a sip n' puff system, a fiber optic tray array, a proximity head array, or a proximity switch array. The turn rate and linear speed circuits 333", 335' may be interconnected and the corresponding output signals of both circuits may be based at least in part on both the turn rate and linear speed command signals 332, 334.

The first summing node 341 may include a first input connected to said output of the turn rate circuit 333" and a second input connected to an output of the veer feedback switch 351. The output of the first summing node 341 may be connected to a subtracting input of the subtracting node 343 and a first input of the second summing node 342. Second inputs of said subtracting node 343 and said second summing node 342 may be connected to the output of said linear speed circuit 335'.

During normal operation, the veer feedback switch 351 may be closed and may provide a turn rate error signal indicative of veer to the first summing node 341. The veer feedback switch 351 may open in response to a fault signal generated by the sensor fault check logic 361. The fault signal may be generated if a fault is detected in one or more of the first and second rate-of-turn sensors 362, 363. The fault signal may be latched by the sensor fault check logic 361 to prevent use of signals from the first and second rate-of-turn sensors 362, 363 if at least one has failed. A latched fault signal may be reset after the motorized wheelchair 300" is brought to a stop, for example, either automatically or via a power reset sequence, soft reset sequence, or activation of a reset control.

The subtracting node 352 may include a subtracting input connected to an output of the veer scale logic 353, a second input connected to the output of the turn rate circuit 333", and an output connected to the error amplifier unit. An output of the summing node 357 of the error amplifier unit may deliver a signal to a first input of the veer feedback switch 351. The error amplifier unit may provide a P, I or PI feedback control circuit for desired turn rates based on actual turn rates. It should be noted that the integrative (I) part of the error amplifier unit, as represented by the I-gain logic 355 and integrator 356, integrates the turn rate error which provides a turn direction or bearing error.

The drift error node 326 may include a first inverting input connected to said drift scale block 328', a second inverting input connected to the left speed sensor 321, a non-inverting input connected to the right side tachometer 322, and an output providing the drift error signal 327 to said drift detection logic 323. Said drift detection logic 323 may provide the offset compensation signal 329 to the integrator logic 325 if the drift error signal 327 does not exceed a predetermined threshold. Conversely, if the predetermined threshold is exceeded, the drift detection logic 323 may provide the drift intervention signal 330 to the turn rate/linear speed limiter logic 324. After receipt of the drift intervention signal 330, the turn rate/linear speed limiter logic 324 may provide a first control signal to the turn rate device 333" and a second control signal to the linear speed circuit 335'.

An output of the first rate-of-turn sensor 362 may be connected to summing inputs of said first subtracting node 364 and said summing node 365. An output of the second rate-of-turn sensor 363 may be connected to a subtracting input of said first subtracting node 364 and a second summing input of said summing node 365. The output of the summing node 365 may be provided to said sensor fault check logic 361. An output signal of said first subtracting node 364 may be connected to a summing input of said second subtracting node 366. The second subtracting node 366 may also include a subtracting input connected to an output signal from the integrator logic 325 of said drift correction unit. The veer scale block 353 of the veer correction unit and the drift scale block 328' of the drift correction unit may both receive an output signal from said second subtracting node 366 of said rate-of-turn sensor unit.

The left and right control loop devices 317', 318' may perform a fast standard routine to maintain rotational speeds of the left and right drive wheels 311, 312 as provided by second summing node 342 and subtracting node 343 within certain predetermined limits. The left and right speed sensors 321, 322, for example, may provide feedback to the corresponding left and right control loop devices 317', 318' for use in maintaining the rotational speeds. Certain differences in the rotational speeds of the left and right drive wheels 311, 312 cause the motorized wheelchair 300" to turn at certain corresponding turn rates. Conversely, when the left and right drive wheels 311, 312 rotate in the same direction (i.e., forward or reverse) at the same speed, the motorized wheelchair 300" normally travels straight forward or straight backward, depending on the direction of rotation.

The turn rate and linear speed circuits 333", 335' may interact in a way that certain threshold values for certain parameters, such as SpeedProduct=(turn rate)×(linear speed) may automatically adjust a maximum linear speed limit as the desired speed changes or automatically adjust a maximum turn rate limit as the desired linear speed changes. For example, at certain desired linear speeds, a limit A may be applied to the desired turn rate by the turn rate circuit 333". The limit A may be defined by LimitA=SpeedProductA/desired linear speed. Additionally, at certain desired turn rates, a limit B may be applied to the desired linear speed by the linear speed circuit 335'. For example, limit B may be defined by LimitB=SpeedProductB/desired turn rate. Notably, these routines do not necessarily require input from the rate-of-turn sensor unit, unless the drift error signal 327 exceeds the predetermined threshold in the drift detection logic 323. If so, the drift detection logic 323 uses the drift intervention signal 330 to activate the turn rate/linear speed limiter logic 324. After activation, the turn rate/linear speed limiter logic 324 uses the first and second control signals to initiate drift intervention operations within turn rate and linear speed circuits 333", 335'. The drift intervention operations may cause the turn rate and linear speed circuits 333", 335' to reduce the maximum turn rate and linear speed values in an orderly fashion so that control of the motorized wheelchair 300" may be recovered to prevent it from skidding, spinning out of control, or tipping. If the drift error signal 327 does not exceed the predetermined threshold, the turn rate/linear speed limiter logic 324 may permit normal operation of the turn rate and linear speed circuits 333", 335'.

In summary, several aspects of controlling the motorized wheelchair 300" include a routine to prevent or reduce veering involving the first and second rate-of-turn sensors 362, 363 and a routine to detect and react to drift involving at least one of the first and second rate-of-turn sensors 362, 363. The veer routine may be used for general stability, for example, when the actual turn rate for the motorized wheelchair 300" differs from the desired turn rate, even if this difference is relatively small. This routine compares desired turn rate data based at least in part on operator manipulation of an input device, e.g. a joystick, associated with the input device 331 with actual turn rate data from the rate-of-turn sensor unit to determine a first turn rate error. This routine may use a proportional (P) closed-loop control method to bring the motorized wheelchair 300" back to the desired course as indicated by the input device being used by the operator based on the first turn rate error. Additionally, this routine may use an integration method to determine a bearing (i.e., turn direction) error from the first turn rate error to bring the motorized wheelchair 300" back to the desired course via an integral closed-loop control process. The drift routine, for example, may detect a loss of traction condition causing the motorized wheelchair 300" to drift off course. In response to detecting drift, the routine may disable normal operations and initiate measures to prevent or reduce loss of control. Drift is detected by comparing data from the left and right speed sensors 321, 322 related to an expected turn rate with data from at least one of the rate-of-turn sensors 362, 363 related to actual turn rate. A deviation between the data indicates there has been loss of traction. If the deviation exceeds a predetermined threshold, the desired turn rate, desired linear speed, and corresponding signals controlling the motors may be adjusted to reduce the turn rate and speed of the motorized wheelchair 300" in order to recover from the loss of traction. For example, when necessary, this routine may disable normal operations by reducing the maximum values for desired turn rate and desired linear speed in an orderly fashion to avoid having the motorized wheelchair 300" skid, spin out of control, or tip over.

The first and second rate-of-turn sensors 362, 363 in the motorized wheelchair 300" may be oriented and connected to reference voltages in the same manner as described above with reference to FIG. 3A. As such, the dynamic sensor offset compensation feature and the fail-safe feature, both described above, may also be provided as options in this embodiment of the motorized wheelchair 300".

The various features shown in FIG. 3C and discussed in the accompanying text (e.g., veer compensation, integrated veer compensation, dynamic sensor offset compensation, drift intervention, and any of the various fail-safe features associated with veer compensation or drift intervention) may be used alone or together to provide functionality to exemplary wheelchairs. Thus, systems may incorporate any one, or any two or more of these features, to provide enhanced functionality. In one embodiment, control of the motors via negative turn rate error feedback for veer compensation may be provided, the turn rate error being the difference between the actual turn rate associated with the rate-of-turn sensors and the desired turn rate associated with the input device. The negative turn rate error feedback can include a proportional (P) component. In another embodiment, the turn rate error can be integrated and the negative turn rate error feedback can also include an integral component. This provides PI-type feedback control. In still another embodiment, the negative turn rate error feedback can include the integrative (I) component without the proportional (P) component. In yet another embodiment, the rate-of-turn sensor unit can provide dynamic sensor offset compensation for offsets in the actual turn rate signals associated with the rate-of-turn sensors that are due to certain external parameters, such as temperature and supply voltage, during operation of the motorized wheelchair. In still yet another embodiment, the rate-of-turn sensor unit can provide a fail-safe feature that disables the negative turn rate error feedback if one of the rate-of-turn sensors fails. In yet another embodiment, if the actual turn rate associated with the first rate-of-turn sensor 362 differs more than a predetermined amount from an expected turn rate associated with the left and right speed sensors 321, 322, decelerate the motorized wheelchair 300' and reduce the turn rate to prevent it from skidding, spinning out of control, or tipping.

Processes implementing an exemplary suite of stability features for an exemplary motorized wheelchair are illustrated in flow charts with reference to FIGS. 4-8. FIG. 4 provides an exemplary embodiment of a fast control loop of an exemplary motorized wheelchair. FIG. 5 provides an exemplary embodiment of a process for processing an actual turn rate signal from a first rate-of-turn sensor in conjunction with controlling an exemplary motorized wheelchair and providing drift detection and intervention. FIG. 6 provides an exemplary embodiment of a process for processing an actual turn rate signal from first and second rate-of-turn sensors in conjunction with controlling an exemplary motorized wheelchair and providing veer compensation. FIG. 7 provides an exemplary embodiment of a process for drift detection and intervention in conjunction with controlling an exemplary motorized wheelchair. FIG. 8 provides an exemplary embodiment of a process for veer detection and compensation in conjunction with controlling an exemplary motorized wheelchair. The description of these flow charts may refer to exemplary elements of motorized wheelchairs described above with reference to FIGS. 1, 2A-C, and 3A-C to assist in correlating the flow charts with the previous drawings.

With reference to FIG. 4, an exemplary process for a fast control loop to control a motorized wheelchair includes a turn rate routine 400. The fast control loop may improve stability of the wheelchair by limiting turn rate and linear speed signals from an input device, such as a joystick, using a first algorithm during normal operation and a second algorithm when the desired turn rate and linear speed exceeds limits for safe turn rates or safe linear speed.

The turn rate routine 400 begins at 402 where an unfiltered turn rate input signal from an input device, such as a joystick (34; FIG. 1) may be read and a corresponding set direction value may be stored. At 404, a corresponding filtered and ramped turn rate value may be compared to a safe turn rate value. If the turn rate is less than the safe turn rate, the turn rate may be limited to a maximum value for a product of the turn rate and linear speed divided by a desired linear speed at 406. Next, normal turn rate ramp and filter processing may be performed (408). At 410, a current turn rate filter value may be output as a processed direction signal. Next, a direction error correct value may be added to the turn rate filter value (412).

At 404, if the turn rate is not less than the safe turn rate, the process may advance to 414 and the turn rate filter may be ramped down using turn rate deceleration. Next, the turn rate ramp may be overwritten with the turn rate filter (416). At 418, a turn rate limit value may be limited to the safe turn rate and the process may return to 410.

With continued reference to FIG. 4, the fast control loop process may continue from 412 with a linear speed routine 420 that begins at 422 where an unfiltered linear speed input signal from the input device, e.g., the joystick (34; FIG. 1), may be read and a corresponding set speed value may be stored. Next, a corresponding filtered and ramped linear speed value may be compared to a safe linear speed value (424). If the linear speed is less than the safe linear speed, the linear speed may be limited to a maximum value for a product of the turn rate and linear speed divided by a desired turn rate at 426. Next, normal linear speed ramp and filter processing may be performed along with tremor filtering (428). At 430, a current linear speed filter value may be output as a processed linear speed signal. Next, processing to convert desired turn rate and desired linear speed to individual control signals for the left and right motors (313', 314'; FIG. 3) may continue as usual.

At 424, if the linear speed is not less than the safe linear speed, the process may advance to 434 and the linear speed filter may be ramped down using a linear speed deceleration. Next, the process may return to 430.

For example, if, while the motorized wheelchair is being driven forward at maximum speed, the user commands a sharp right curve, the signal is immediately received and processed by the turn rate routine 400. At 404, the processed signal is checked to determine if the turn rate command signal input by the user, in combination with the high linear speed signal is permissible, and, if not, said turn rate command signal is modified in that the turn rate signal is reduced to a lower commanded turn rate, and the wheelchair turns, following less sharply curved track at the high linear speed. In this way, loss of traction may be prevented in advance, even though the user had commanded a turn signal that might have otherwise caused the wheelchair to lose traction and possibly spin-out or tip over. As the linear speed of the motorized wheelchair decreases, if the user maintains the command to execute a sharp right curve, the controller may cause the motorized wheelchair to execute a sharper turn, as the combination of the turn rate command signal and the linear speed signal indicate that such a sharper turn may be executed without loss of traction.

With reference to FIG. 5, processing an actual turn rate signal from a first rate-of-turn sensor (362, FIG. 3) in conjunction with controlling an exemplary motorized wheelchair and providing drift detection and intervention may include the exemplary process 500. The process effectively determines if the first rate-of-turn sensor is operating within acceptable limits. For example, if the first rate-of-turn sensor is operating properly, the drift intervention feature may be enabled during operation of the motorized wheelchair.

The process 500 begins at 502 where an actual turn rate signal related to the first rate-of-turn sensor and a corresponding offset value. At 504, the actual turn rate signal may be compared to a valid signal range. If the actual turn rate signal is valid, a current rate-of-turn sensor offset may be compared to a valid offset range at 506. If the offset is valid, a first rate-of-turn sensor error flag may be checked to determine if the error flag is set at 508. If the error flag is not set, the process may advance to 510 where the actual turn rate signal from the first rate-of-turn sensor can be used to calculate drift for the motorized wheelchair. At 512, turn rate and linear speed limit settings can be updated. Next, processing may continue with a fault check for use of the first rate-of-turn sensor in combination with a second rate-of-turn sensor (514). An exemplary embodiment of such a dual rate-of-turn sensor fault check is provided in FIG. 6.

At 504, if the actual turn rate signal is not valid, and at 506, if the offset is not valid, the process may advance to 516 where a check for two successive faults may be performed. If there have not been two successive faults, the process may advance from 516 directly 508 to continue processing. However, if there have been two successive faults, the process may advance from 516 to 518 and set the first rate-of-turn sensor error flag before continuing processing at 508.

At 508, if the first rate-of-turn sensor error flag is set, the process advances to 520 where a direction error correction value may be cleared. Next, a position error integrator may be cleared (522). At 524, turn rate and linear speed limits may be set to predetermined limits for controlling the motorized wheelchair without dual (first and second) rate-of-turn sensors and without corresponding compensation for turn rate errors due to veer. Next, the rate-of-turn sensor fault check routine may exit due to a fault in the first rate-of-turn sensor (526). In another embodiment, the rate-of-turn sensor fault check routine may check a second rate-of-turn sensor for use in conjunction with drift intervention in lieu of the failed first rate-of-turn sensor.

With reference to FIG. 6, processing an actual turn rate signal from first and second rate-of-turn sensor (362, 363, FIG. 3) in conjunction with controlling an exemplary motorized wheelchair and providing veer compensation may include an exemplary process 600 that continues from 514 of FIG. 5. The process determines if the second rate-of-turn sensor is operating within acceptable limits. For example, if both the first and second rate-of-turn sensors are operating properly, the veer compensation feature may be enabled during operation of the motorized wheelchair.

The process 600 continues from 514 of FIG. 5 with 602 where an actual turn rate signal related to the second rate-of-turn sensor and a corresponding offset value may be read. At 604, the second actual turn rate signal may be compared to a valid signal range. If the second actual turn rate signal is valid, a current second rate-of-turn sensor offset may be compared to a valid offset range at 606. If the offset is valid, an absolute value of a sum of the first and second actual turn rate signals may be compared to a predetermined threshold at 608. If the sum of the first and second actual turn rate signals is less than the threshold, a second rate-of-turn sensor error flag may be checked to determine if the error flag is set at 610. If the error flag is not set, the process may advance to 612 where the sum of the actual turn rate signals from the first and second rate-of-turn sensor can be used to calculate veer and determine a direction error correction signal for the motorized wheelchair. At 614, the process is ended and the routine may be exited.

At 604, if the second actual turn rate signal is not valid, at 606, if the corresponding offset is not valid, and at 608, if the sum of the first and second actual turn rate signals is not less than the threshold, the process may advance to 616 where a check for two successive faults may be performed. If there have not been two successive faults, the process may advance from 616 directly 610 to continue processing. However, if there have been two successive faults, the process may advance from 616 to 618 and set the second rate-of-turn sensor error flag before continuing processing at 610.

At 610, if the second rate-of-turn sensor error flag is set, the process advances to 620 where a direction error correction value may be cleared and a position error integrator may be cleared. Next, the rate-of-turn sensor fault check routine may exit due to a fault in the second rate-of-turn sensor (622).

With reference to FIG. 7, drift detection and intervention in conjunction with controlling an exemplary motorized wheelchair may include an exemplary process 700 that continues from 510 of FIG. 5. The process may utilize the first rate-of-turn sensor (362, FIG. 3) and left and right speed sensors (321, 322, FIG. 3) to detect drift due to, for example, a loss of traction condition and to control the motorized wheelchair in a manner that reduces drift and provides increased stability due to, for example, the loss of traction condition.

The process 700 begins at 702 where a value for drift may be determined based on a predetermined algorithm taking into account an actual turn rate and an expected turn rate. In one embodiment, the determined drift may be based on an actual turn rate signal from a rate-of-turn sensor (362, FIG. 3), an offset value associated with the actual turn rate signal, a drift scaling factor (328, FIG. 3), and signals from left and right speed sensors (321, 322, FIG. 3) associated with corresponding left and right drive wheels (311, 312, FIG. 3). An exemplary algorithm may determine drift as follows: Drift=Actual Turn Rate−Offset−(Scaling Factor*(Left Wheel Speed−Right Wheel Speed)). At 704, the drift value may be limited and filtered. Next, an absolute value of drift may be compared to a first predetermined threshold related to a loss of traction condition (706). For example, the first predetermined threshold value may be set to a relatively low value for purposes of classifying drift offset error from a loss of traction condition. If the drift absolute value is less than the first threshold, the drift (non-absolute) value may be checked to determine if it is positive or negative at 708, for example, by comparing the drift value to zero. If the drift value is positive, an offset associated with the first rate-of-turn sensor may be increased at 710. At 708, if the drift value is not positive, the offset associated with the first rate-of-turn sensor may be decreased at 712. Next, similar offset tracking may be performed for the second rate-of-turn sensor (714). Typically, the offsets are increased or decreased relatively small amounts during a given iteration of the process. At 716, a linear speed limit associated with drift intervention may be set to infinity or may be disabled. Similarly, a turn rate limit associated with drift intervention may be set to infinity or may be disabled (718).

In one embodiment, if the detected drift signal is relatively low, the drift detection logic (323, FIG. 3) may produce an offset compensation signal 329 which is integrated over time by the integrator logic (325, FIG. 3) and subtracted from the actual turn rate signal originating from subtracting node 364 at the subtracting node 366. This may provide for an actual turn rate signal offset error correction. In other words, if the drift signal from combining node 326 is relatively small, relatively good traction can be assumed and the integrator logic 325 may slowly adjust the offset compensation signal 329 to neutralize this offset.

With reference again to FIG. 7, at 706, if the drift absolute value is not less than the first predetermined threshold, the process may begin determining a second threshold at 720 by multiplying a vehicle speed parameter by a slope parameter to determine a threshold adjustment factor. At 722, the threshold adjustment factor may be limited to not exceed a maximum threshold adjustment factor. Next, threshold adjustment factor may be added to the first predetermined threshold to determine the second threshold (724). At 726, the absolute value of drift may be compared to the second threshold. For example, the second threshold value may be set to a level for purposes of classifying loss of traction conditions at relatively low speeds from loss of traction conditions at higher speeds. If the drift absolute value is less than the second threshold, the process may advance to 716. However, at 726, if the drift absolute value is not less than the second threshold, a linear speed limit associated with drift intervention may impose a lower maximum linear speed on the desired linear speed (728). The lower maximum linear speed may be referred to as a "maximum drift intervention linear speed." Similarly, at 730, a turn rate limit associated with drift intervention may impose a lower maximum turn rate on the desired turn rate. The lower maximum turn rate may be referred to as a "maximum drift intervention turn rate." The maximum values for turn rate and linear speed are reduced for drift intervention to prevent the motorized wheelchair from spinning out of control or tipping after loss of traction. At 732, the drift intervention routine has reached its end and may exit, for example, by returning to 512 of FIG. 5.

In one embodiment, if drift is higher than the first threshold, the process may decrease the drift sensitivity of the routine at lower speeds of the vehicle. For example, by adding a speed-dependent teen threshold adjustment factor to the first threshold, a second threshold may be generated which provides a tolerance to the drift signal between conditions leading to offset compensation and conditions leading to drift intervention. If the drift signal exceeds the second threshold, a hazardous loss of traction condition may exist and a spin-out may be imminent. If such a situation is detected, lower values for maximum permitted (ceiling) linear speed and maximum permitted (ceiling) turn rate may be set. The motorized wheelchair may be decelerated in an orderly fashion to these lower values and then may not be allowed to exceed the maximum permitted (ceiling) linear speed or turn rate. If the motorized wheelchair is already traveling below the maximum permitted (ceiling) linear speed or turn rate, no special action is taken; normal linear speed and turn rate ramp processing may commence instead.

With reference to FIG. 8, veer detection and compensation in conjunction with controlling an exemplary motorized wheelchair, for example, may include an exemplary process 800 that continues from 612 of FIG. 6. The process may utilize the first and second rate-of-turn sensors (362, 363, FIG. 3) and left and right speed sensors (321, 322, FIG. 3) to detect veer and to control the motorized wheelchair in a manner that reduces veer and provides increased stability.

The process 800 begins at 802 where a value for a turn rate error indicative of veer may be determined based on a predetermined algorithm taking into account an actual turn rate and a desired turn rate. In one embodiment, the determined turn rate error may be based on an actual turn rate signal from first and second rate-of-turn sensors (362, 363, FIG. 3), an offset value associated with the actual turn rate signal, a veer scaling factor (353, FIG. 3), and a desired turn rate related to turn rate and linear speed command signals (332, 334, FIG. 3) from the input device (331, FIG. 3). An exemplary algorithm may determine the turn rate error as follows: Turn Rate Error= (First Actual Turn Rate−Offset)−(Second Actual Turn Rate−Offset)−(Scaling Factor*Desired Turn Rate). At 804, the turn rate error may be limited and filtered. Next, a proportional error signal may be determined by multiplying the turn rate error by a P-gain stage (806). At 808, the P error signal may be limited. Next, an integrated error signal may be determined by integrating a result from multiplying the turn rate error by an I-gain stage (810). At 812, the I error signal may be limited. Next, a PI error signal may be determined by summing the P and I error signals (814). At 816, the process may ramp down the PI error signal when in neutral and may ramp up the PI error signal when out of neutral. The ramping up or down results in a ramped PI error signal. Next, a veer compensation signal may be set to the ramped PI error signal (818). The veer compensation signal may be used in conjunction with the desired turn rate signal to compensate for the motorized wheelchair veering off from the user's desired course. At 820, the veer compensation routine has reached its end and may exit, for example, by returning to 614 of FIG. 6.

In one embodiment, an offset-cancelled turn rate signal from the first and second rate-of-turn sensors (362, 363, FIG. 3) may be scaled by veer scale logic (353, FIG. 3) and may be processed with the turn rate command signal (332, FIG. 3) at a subtracting node (352, FIG. 3). The difference between the actual turn rate and the desired turn rate may be integrated over time and the integrated signal may provide feedback to a summing node (341, FIG. 3) that distributes signals to left and right control loop devices (317, 318, FIG. 3) for controlling left and right motors (313, 314, FIG. 3). In this way, an integrated error signal may be used to adjust the course of the motorized wheelchair to a course corresponding to the desired course from the input device (331, FIG. 3). This integrative technique provides veer compensation for bearing (i.e., turn direction) errors without angular position sensors.

Generally, a motorized wheelchair with various combinations of the improved stability features described herein is provided along with various methods for providing said stability features. In one embodiment, a motorized wheelchair comprises a control device wherein, after loss of traction is detected, the motorized wheelchair may be decelerated or the turn rate may be reduced. In another embodiment, the motorized wheelchair comprises a control device including a closed-loop control system which stabilizes bearing (i.e., turn direction) error of the motorized wheelchair in maintaining a desired turn rate in relation to an actual turn rate. In still another embodiment, the motorized wheelchair comprises a control device including a difference integrator unit. In yet another embodiment, the motorized wheelchair comprises a control device including a tachometer unit comprising an integrator logic between a drift detection logic and an actual turn rate signal to provide offset compensation to reduce a turn rate error signal when loss of traction is not present. In still yet another embodiment, the tachometer unit may also include a speed limiter which delivers control signals to a turn rate circuit and a linear speed circuit to activate drift intervention operations, wherein each of said turn rate and linear speed circuits has an output connected to left and right control loop devices via a node unit. In another embodiment, the motorized wheelchair comprises anti-tip wheels to avoid tipping. In still another embodiment, the motorized wheelchair comprises a control device that operates with nominal ramps at maximal linear speed, so that if the desired turn rate is too high it reduces the desired turn rate to a threshold value corresponding to the maximal linear speed, and vice-versa.

While the invention is described herein in conjunction with one or more exemplary embodiments, it is evident that many alternatives, modifications, and variations will be apparent to those skilled in the art. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof. Any element in a claim that does not explicitly state means for performing a specified function, or step for performing a specific function, is not to be interpreted as a means or step clause as specified in 35 U.S.C. §112, ¶6. In particular, the use of step of in the claims herein is not intended to invoke the provisions of 35 U.S.C. §112, ¶6.

The invention claimed is:

1. A motorized wheelchair, comprising:
    left and right drive wheels connected to a wheelchair chassis and providing rolling support for said motorized wheelchair;
    a left motor in operative communication with the left drive wheel;
    a right motor in operative communication with the right drive wheel;
    a first wheelchair chassis rate-of-turn sensor arranged to provide a first signal outputting a first wheelchair chassis actual turn rate;
    a first wheel speed sensor arranged to provide a second signal indicative of a speed of said left drive wheel;
    a second wheel speed sensor arranged to provide a third signal indicative of a speed of said right drive wheel; and
    a controller in operative communication with the left and right motors, first rate-of-turn sensor, and said first and second speed sensors, said controller arranged to independently control the left and right motors to drive the left and right drive wheels based at least in part on operator manipulation of one or more input devices, said controller also arranged to combine the first, second, and third signals to detect wheelchair drift and wheelchair veer; and
    wherein detecting wheelchair drift and wheelchair veer comprises comparing the wheelchair chassis actual turn rate to an expected wheelchair chassis turn rate, wherein the expected wheelchair chassis turn rate is based at least in part on the second and third signals.

2. The motorized wheelchair of claim 1, wherein said controller is also arranged to combine the first, second, and third signals in a manner that provides a turn rate error related to a difference between the actual turn rate and the expected turn rate of the motorized wheelchair chassis and wherein the controller is arranged to adjust control of the left and right motors if the turn rate error exceeds a first predetermined threshold.

3. The motorized wheelchair of claim 2, wherein the controller is arranged to integrate the turn rate error over time if the turn rate error does not exceed a first predetermined threshold to provide an offset and adjust the actual turn rate to compensate for the offset.

4. The motorized wheelchair of claim 2, wherein the controller:
    is arranged to adjust control of the left and right motors if the turn rate error exceeds a second predetermined threshold to recover from a loss of traction condition (wheelchair drift); and
    is arranged to continue normal control of the left and right motors if the turn rate error exceeds the first predetermined threshold and does not exceed the second predetermined threshold (wheelchair veer).

5. The motorized wheelchair of claim 4, wherein if the turn rate error exceeds the second predetermined threshold, the controller is arranged to reduce the turn rate and linear speed command signals to predetermined levels to recover traction.

6. The motorized wheelchair of claim 4, wherein if the turn rate error exceeds the second predetermined threshold, the controller is arranged to stop the wheelchair to recover traction.

7. The motorized wheelchair of claim 2, wherein the controller is arranged to integrate the turn rate error to determine a bearing error and to control the left and right motors to reduce the bearing error.

8. The motorized wheelchair of claim 2, further including:
a second wheelchair chassis rate-of-turn sensor in operative communication with the controller and arranged to provide a fourth signal outputting a second wheelchair chassis actual turn rate; and
wherein said controller is arranged to combine the fourth signal with the first, second, and third signal such that the turn rate error is also based at least in part on the fourth signal.

9. The motorized wheelchair of claim 8, wherein the second rate-of-turn sensor is flipped 180 degrees in relation to the first rate-of-turn sensor such that values for the first and fourth signals are on opposite sides of a value for a zero turn rate; and
wherein the controller is arranged to combine the first and fourth signals in a manner that dynamically compensates the actual turn rate for offset errors in the first and fourth signals induced by one or more external parameters to provide a compensated actual turn rate during operation of the motorized wheelchair, said controller also arranged to combine the compensated actual turn rate and the expected turn rate to provide the turn rate error.

10. The motorized wheelchair of claim 1, further comprising one or more input devices in operative communication with the controller and arranged to provide turn rate and linear speed command signals based at least in part on operator manipulation of the one or more input devices, the turn rate command signal related to a desired turn rate of the motorized wheelchair.

11. The motorized wheelchair of claim 10, wherein the controller:
is arranged to down-regulate said turn rate command signal if a predetermined threshold value for a linear speed command signal is exceeded and down-regulate a linear speed command signal when a predetermined threshold value for a turn rate command signal is exceeded;
is arranged to limit the turn rate command signal or the linear speed command signal if a product of the turn rate and linear speed command signals exceeds a predetermined threshold value; and
regulates said input command signals so that a predetermined threshold value related to a product of the actual turn rate and an actual linear speed is not exceeded, wherein the turn rate command signal and the linear speed command signal are input command signals representing a desired turn rate and a desired linear speed.

12. The motorized wheelchair of claim 1, wherein said first wheelchair chassis rate-of-turn sensor comprises at least one of a gyroscope, an angular rate sensor, and a combination of accelerometers.

13. The motorized wheelchair of claim 1, wherein said first and second wheel speed sensors comprise at least one of a tachometer, a tachogenerator, a resolver, or any type of sensor suitable for measuring a linear speed, an angular speed, and a time between revolutions of the drive wheels.

14. A method of controlling a motorized wheelchair, comprising:
independently controlling left and right motors to drive corresponding left and right drive wheels connected to a wheelchair chassis based at least in part on operator manipulation of one or more input devices associated with an input device;
sensing a first parameter using a first wheelchair chassis rate-of-turn sensor and providing a first signal outputting a first wheelchair chassis actual turn rate;
sensing a second parameter using a first wheel speed sensor and providing a second signal indicative of a speed of said left drive wheel;
sensing a third parameter using a second wheel speed sensor and providing a third signal indicative of a speed of said right drive wheel; and
combining the first, second, and third signals to detect wheelchair drift and wheelchair veer, and wherein detecting wheelchair drift and wheelchair veer comprises comparing the wheelchair chassis actual turn rate to an expected wheelchair chassis turn rate, wherein the expected wheelchair chassis turn rate is based at least in part on the second and third signals.

15. The method of claim 14, wherein combining the first, second, and third signals to detect wheelchair drift and wheelchair veer includes combining the first, second, and third signals in a manner that provides a turn rate error related to a difference between the actual turn rate and the expected turn rate of the motorized wheelchair chassis; and further including:
adjusting control of the left and right motors if the turn rate error exceeds a first predetermined threshold.

16. The method of claim 15, further including:
integrating the turn rate error over time if the turn rate error does not exceed the first predetermined threshold to provide an offset; and
adjusting the actual turn rate to compensate for the offset.

17. The method of claim 15, further including:
adjusting control of the left and right motors if the turn rate error exceeds a second predetermined threshold to recover from a loss of traction condition (wheelchair drift); and
continuing normal control of the left and right motors if the turn rate error exceeds the first predetermined threshold and does not exceed the second predetermined threshold (wheelchair veer).

18. The method of claim 17, wherein if the turn rate error exceeds the second predetermined threshold, the controller is arranged to reduce the turn rate and linear speed command signals to predetermined levels to recover traction.

19. The method of claim 17, wherein if the turn rate error exceeds the second predetermined threshold, the controller is arranged to stop the wheelchair to recover traction.

20. The method of claim 15, further including:
sensing a fourth parameter using a second wheelchair chassis rate-of-turn sensor and providing a fourth signal outputting a second wheelchair chassis actual turn rate, and combining the fourth signal with the first, second, and third signal such that the turn rate error is also based at least in part on the fourth signal.

21. The method of claim 20, wherein the second rate-of-turn sensor is flipped 180 degrees in relation to the first rate-of-turn sensor such that values for the first and fourth signals are on opposite sides of a value for a zero turn rate, the method further including:
combining the first and fourth signals in a manner that dynamically compensates the actual turn rate for offset errors in the first and fourth signals induced by one or more external parameters to provide a compensated actual turn rate during operation of the motorized wheelchair; and
combining the compensated actual turn rate and the expected turn rate to provide the turn rate error.

22. The method of claim 14, further including:
down-regulating a turn rate command signal if a predetermined threshold value for a linear speed command signal is exceeded and down-regulating the linear speed command signal if a predetermined threshold value for the turn rate command signal is exceeded;
limiting the turn rate command signal or the linear speed command signal if a product of the turn rate and linear speed command signals exceeds a predetermined threshold value; and
regulating input command signals so that a predetermined threshold value related to a product of the actual turn rate and an actual linear speed is not exceeded, wherein the turn rate command signal and the linear speed command signal are input command signals representing a desired turn rate and a desired linear speed.

23. The method of claim 14, further including:
integrating the turn rate error to determine a bearing error; and
adjusting control of the left and right motors to reduce the bearing error.

24. The method of claim 14, wherein said first wheelchair chassis rate-of-turn sensor comprises at least one of a gyroscope, an angular rate sensor, and a combination of accelerometers.

25. The method of claim 14, wherein said first and second wheel speed sensors comprise at least one of a tachometer, a tachogenerator, a resolver, or any type of sensor suitable for measuring a linear speed, an angular speed, and a time between revolutions of the drive wheels.

26. A drive control device for a vehicle comprising left and right drive wheels connected to a vehicle chassis, said drive control device including: a controller in operative communication with an input device and a first vehicle chassis rate-of-turn sensor, wherein said first vehicle chassis rate-of-turn sensor is provided for sensing and outputting an actual turn rate of the vehicle, wherein a first wheel speed sensor is arranged to provide a first signal indicative of a speed of the left drive wheel, wherein a second wheel speed sensor is arranged to provide a second signal indicative of a speed of the right drive wheel, wherein the controller is arranged to detect vehicle drift and vehicle veer by processing the actual turn rate with the first and second signals.

27. The drive control device of claim 26, wherein if the turn rate error exceeds the second predetermined threshold, the controller is arranged to reduce the turn rate and linear speed command signals to predetermined levels to recover traction.

28. The drive control device of claim 26, wherein if the turn rate error exceeds the second predetermined threshold, the controller is arranged to stop the wheelchair to recover traction.

29. The motorized wheelchair of claim 26, wherein said first wheelchair chassis rate-of-turn sensor comprises at least one of a gyroscope, an angular rate sensor, and a combination of accelerometers.

30. The motorized wheelchair of claim 26, wherein said first and second wheel speed sensors comprise at least one of a tachometer, a tachogenerator, a resolver, or any type of sensor suitable for measuring a linear speed, an angular speed, and a time between revolutions of the drive wheels.

* * * * *